United States Patent

Nakamura et al.

Patent Number: 5,863,987
Date of Patent: Jan. 26, 1999

[54] ADHESIVE COMPOSITIONS AND PNEUMATIC TIRE

[75] Inventors: Masaaki Nakamura; Kozo Sasaki, both of Kodaira, Japan

[73] Assignee: Bridgestone Corporation, Tokyo, Japan

[21] Appl. No.: 849,668

[22] PCT Filed: Oct. 14, 1996

[86] PCT No.: PCT/JP96/02969

§ 371 Date: Jun. 11, 1997

§ 102(e) Date: Jun. 11, 1997

[87] PCT Pub. No.: WO97/13818

PCT Pub. Date: Apr. 17, 1997

[30] Foreign Application Priority Data

Oct. 13, 1995 [JP] Japan ................................ 7-265559
Dec. 20, 1995 [JP] Japan ................................ 7-331786

[51] Int. Cl.$^6$ .............................. C08L 53/00; C09J 4/06
[52] U.S. Cl. ........................................... 525/92 D
[58] Field of Search ................................ 525/92 D

[56] References Cited

U.S. PATENT DOCUMENTS 4,376,854  3/1983  Yamaguchi et al. ................ 528/137

FOREIGN PATENT DOCUMENTS 5-311577  11/1993  Japan .
6-74401   9/1994  Japan .

Primary Examiner—Joseph L. Schofer
Assistant Examiner—Wu C. Cheng
Attorney, Agent, or Firm—Sughrue, Mion, Zinn, Macpeak & Seas, PLLC

[57] ABSTRACT

An adhesion force between a polyester cord and adherend rubber is improved by an adhesive composition comprising vinylpyridine-styrene-butadiene copolymer latex particles having at least two kinds of monomer compositions and a thermosetting resin comprised of resol type condensate and novolak type condensate of resorcin-formaldehyde.

7 Claims, 1 Drawing Sheet

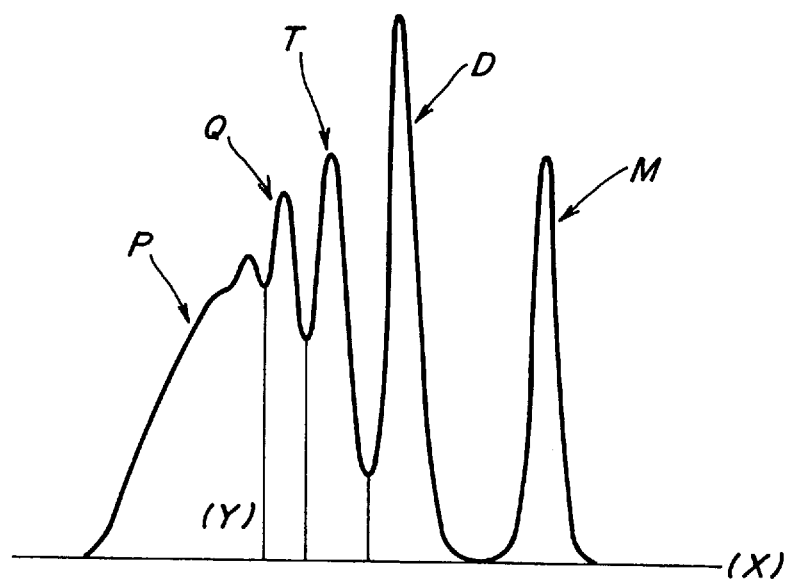
FIG_1

ADHESIVE COMPOSITIONS AND PNEUMATIC TIRE

This invention relates to an adhesive composition, and more particularly to an adhesive composition capable of firmly adhering a polyester material or the like to rubber.

Furthermore, this invention relates to a pneumatic tire, and more particularly to a pneumatic tire using a polyester cords as a reinforcement.

BACKGROUND ART

A polyester material having an ester bond in its main chain is a linear polymer represented by polyethylene terephthalate and is high in the initial modulus, excellent in the dimensional stability under heating and in the cost, so that it is very useful as a reinforcement for rubber articles such as tire, belt, air spring, rubber hose and the like in forms of filament, cord, cable, cord fabric, canvas and the like.

However, when the polyester material is used as a reinforcement for such rubber articles, since the polyester material is minute in the molecular structure and less in the number of functional groups, adhesion to rubber to rubber is insufficiently obtained by an adhesive composition, effective for adhering materials such as nylon rayon or the like and rubber, comprising a resorcin-formaldehyde condensate obtained by a resol-forming reaction and a rubber latex including vinylpyridine-styrene-butadiene terpolymer.

For this end, there have formerly and numerously been proposed a method wherein surface of a polyester cord is subjected to an alkali-amine treatment to increase the number of an active group such as —OH, —COOH, —NH$_2$ or the like on the surface, a method wherein a compound having a functional group which is capable of a hydrogen bonding or a primary bonding is introduced onto the surface of the polyester cord using an isocyanate compound or an epoxy compound and then treated with an adhesive solution, and such adhesive compositions.

However, the strength of the polyester cord is degraded by the alkali-amine treatment.

Further, the isocyanate compound or the epoxy compound is high in reactivity and reacts with water as a solvent of the adhesive solution or resorcin-formaldehyde condensate in the adhesive solution, so that it is very difficult to provide an adhesive solution of one package composition and also the adhesion property is damaged. For this end, it is required to divide the adhesion treating step into two stages and hence extra installations and steps are necessary, which are unfavorable from a viewpoint of resource-saving and energy-saving.

Also, the treatment with the isocyanate compound or the epoxy compound is unfavorable from a viewpoint of environmental conservation because of the scattering of these compounds into air during the adhesion treatment, and of injurious effect of fumes and steam created during the heat treatment upon humans, and the like.

Moreover, the polyester cord treated with the isocyanate compound or the epoxy compound is hardened and the handling thereof is difficult in production. In addition, there is a most serious problem that when such a polyester cord is used at a high temperature under a high strain, there are caused rapid deterioration of adhesion and degradation of cord strength. Hence the service life of an rubber article using such a cord as a reinforcing material lowers considerably.

As reasons of these phenomena, there can be mentioned facts that since the isocyanate compound or the epoxy compound is primarily bonded to the polyester surface to thereby form a kind of graft polymer on the surface, the adhesion breakage of the bonded portion is easily caused by hydrolysis of polyester, aminolysis with a residue of vulcanizing agent in a rubber composition and the like in use at a high temperature, and that the bonded portion is weak to mechanical input due to the large difference of rigidity between surface and inside of the polyester under high strain, and the like.

For the weight reduction has been proceeded from a viewpoint of energy-saving, and hence it is necessary to further improve the stability and fatigue life to thermal input and mechanical input as compared with the conventional ones. From this reason, the use of an isocyanate compound or an epoxy compound is also unfavorable in the treatment for the polyester material.

On the other hand, a method of adding a resin imparting adhesion/tackiness as an adhesion promoter to the above-mentioned adhesive solution and adhesive compositions thereof are numerously proposed as an adhesive for the polyester. They enable the adhesion work at one-package type and are excellent in the energy-saving and cost-saving and also the lowering of strength of a cord treated with such an adhesive is small.

Because water having good operability and properties to environment is mainly used as a solvent, there are numerously proposed resins easily soluble in water such as phenolic resin and the like as an adhesion/tackiness imparting resin added. For example, when using a resin obtained by a novolak-forming reaction between resorcin and formaldehyde in the presence of a neutral or acidic catalyst, the adhesion force is improved. But if rubber latex defined in the invention as mentioned below is not used in the adhesive solution, the adhesion performances are insufficient and particularly the adhesion deterioration is caused by thermal input during vulcanization step, when the adhesion to adherend rubber should be enhanced, and it can not be said that the above resin is satisfactory.

Furthermore, there has been proposed, for example, a reaction product between p-chlorophenol and formaldehyde, a reaction product between resorcin and triallyl cyanurate and the like. They are, however, insufficient in the adhesion performances and cause an adhesion deterioration particularly at a higher temperature, so that it can not be said that they are satisfactory.

Recently, in pneumatic tires provided with rubber made members such as carcass and the like using polyester cords as a reinforcing material, since tire performances are improved and a temperature at vulcanization step is made higher than the conventionally used temperature to obtain better productivity, and hence thermal input to the polyester cord becomes much severer over a period ranging from this vulcanization step up to use, there is a possibility that even the aforementioned adhesive compositions become insufficient in heat resistance.

As mentioned above, the properties required in the adhesive composition suitable for use in the polyester material or the like for rubber reinforcement are that it is one-package form, the storing stability is good, it is free from toxicity and environmental pollution, the cord strength is not lowered by the adhesion treatment, the adhesion property is high, the sufficiently high adhesion force at higher temperatures applied during vulcanization step and in use can be maintained, in another words, heat resistance is sufficient, and the like.

DISCLOSURE OF THE INVENTION

It is an object of the invention to provide a novel adhesive composition satisfying all of the above properties.

It is another object of the invention to provide a pneumatic tire using polyester cords subjected to adhesion treatment with the above adhesive composition as a reinforcing material, in which adhesion deterioration and lowering of strength are not caused even when being used at a high speed under a high load or at a higher temperature under a higher strain.

In order to achieve the above objects, the invention has the following constructions:

(1) The adhesive composition according to the invention is characterized in that 14–205 parts by weight, preferably 38–115 parts by weight as a solid content of a thermosetting resin including a resol type condensate obtained by a resol-forming reaction between resorcin and formaldehyde and a novolak type condensate obtained by a novolak-forming reaction between resorcin and formaldehyde is included based on 100 parts by weight as a solid content of vinylpyridine-styrene-butadiene type sequential copolymer rubber latex containing 20–100% by weight of Vp-St-Bd type sequential copolymer obtained by sequential-polymerization of (a) a monomer mixture of 3–25% by weight, preferably 5–15% by weight of a pyridine ring containing compound, 25–80% by weight, preferably 35–70% by weight of an unsubstituted or substituted styrene, or of an unsubstituted or substituted styrene and an aliphatic vinyl compound, and 5–60% by weight, preferably 15–60% by weight of a conjugated diene compound, and (b) a monomer mixture of 5–25% by weight, preferably 5–20% by weight of a pyridine ring containing vinyl compound, 5–45% by weight, preferably 10–40% by weight of an unsubstituted or substituted styrene, or of an unsubstituted or substituted styrene and an aliphatic vinyl compound, and 40–83% by weight, preferably 40–80% by weight of a conjugated diene compound, in which a weight ratio of a copolymer component (a') obtained by the polymerization of the monomer mixture (a) to a copolymer component (b') obtained by the polymerization of the monomer mixture (b) in the resulting Vp-St-Bd type sequential copolymer is 10/90–80/20, preferably 50/50–80/20, and the content of the conjugated vinyl compound in the monomer mixture (b) is higher than that in the monomer mixture (a).

The term "sequential-polymerization" used herein means "multi-stage feed polymerization".

In the thermosetting resin, it is favorable that the resol type condensate is obtained by a resol-forming reaction of resorcin or a resorcin-formaldehyde resin oligomer with formaldehyde in the presence of a basic catalyst and is compounded in an amount of 4–35 parts by weight, preferably 8–15 parts by weight as a solid content based on 100 parts by weight as a solid content of the rubber latex, while the novolak condensate is obtained by a novolak-forming reaction of resorcin and formaldehyde in the presence of a neutral or acidic catalyst and is compounded in an amount of 10–170 parts by weight, preferably 30–100 parts by weight based on 100 parts by weight as a solid content of the rubber latex.

(2) It is favorable that the amount of the aliphatic vinyl compound in each of the monomer mixture (a) and the monomer mixture (b) is not more than 15% by weight, preferably not more than 5% by weight.

(3) It is favorable that not more than 80% by weight of styrene-butadiene copolymer and/or the copolymer obtained by the polymerization of only a monomer mixture satisfying a composition range of the monomer mixture (b) is included in the solid content of the rubber latex.

(4) It is favorable that the resol type condensate being constitutional component of so-called RFL solution is obtained by a resol-forming reaction under mixing with the rubber latex.

(5) It is favorable that the novolak condensate is added as an adhesion promoter to a composition comprising the rubber latex and the resol type condensate.

(6) It is favorable that an area ratio of 2–4 resorcin nuclei connecting component in the novolak type condensate is not less than 40%, preferably not less than 50% through an analysis of gel permeation chromatography (GPC).

(7) A pneumatic tire according to the invention is characterized by using a polyester cord subjected to an adhesion treatment with the aforementioned adhesive composition as a reinforcing material.

BRIEF DESCRIPTION OF THE DRAWING

FIG. 1 is a GPC chart of a novolak type condensate according to the invention.

BEST MODE FOR CARRYING OUT THE INVENTION

The inventors have made various studies with respect to deterioration of adhesion between a reinforcing material and an adherend rubber composition therefor (hereinafter referred to as adherent rubber) through thermal input and found out that the participation of the adhesive composition, particularly vulcanization reaction of rubber latex is large.

The form of the reinforcing material for rubber is not particularly restricted but may be cord, film, short fiber, nonwoven fabric or the like. Now, the invention will be described in detail by taking a cord as a form of the reinforcing material.

During a step of adhering an adhesive treated cord which has been immersed, for example, in an adhesive composition to an adherend rubber through vulcanization, the latex in the adhesive composition is vulcanized by a vulcanizing agent, a vulcanization accelerator or the like diffused from the adherend rubber to cause the hardening of the adhesive layer, whereby stress concentration is caused between the cord and the adhesive layer and deteriorate adhesion.

Furthermore, it should be considered that even after the adhesion step, the vulcanization reaction proceeds through thermal input generated in the use of the product or the like to cause the similar deterioration of adhesion.

The inventors have variously studied means for improving the heat resistance by controlling or delaying vulcanization reaction of the adhesive composition and confirmed that a method of providing heat resistance by previously adding a substance, such as acid, having a vulcanization controlling effect to the adhesive composition (JP-A-6-287865), or a method of reducing butadiene monomer component which is a crosslinking site to control vulcanization of the latex itself (JP-A-3-163181) are effective.

When a polyester cord is particularly used as a reinforcing material for rubber articles, however, since the polyester material is minute in the molecular structure and less in the number of functional groups, it can not be said that the adhesion is sufficient with the adhesive comprised of the resol type condensate described in JP-A-3-163181 and Vp-St-Bd terpolymer latex obtained by two-stage polymerization having reduced butadiene monomer content.

The inventors have made further studies with respect to the addition of adhesion/tackiness imparting resin to the adhesive composition as an adhesion promoter and found out that an adhesive composition containing a novolak type condensate as an adhesion promoter satisfies all properties required in the adhesive composition for a polyester cord and the like used as a reinforcement for a reinforcing rubber, that is, one-package form, good storing stability, no toxicity-environmental pollution, no lowering of cord tenacity through adhesion treatment, high adhesion property, maintenance of sufficiently high adhesion force even at higher temperatures applied during the vulcanization step or i.e., sufficient heat resistance, and the like.

The reason why such an adhesive composition is particularly suitable for the adhesion between polyester cord and adherend rubber is as follows. That is, since the molecule of the novolak condensate is a straight-chain resin having a relatively low molecular weight and low nucleus-number body consisting essentially of 2–4 aromatic nuclei in one molecule, the solubility and diffusing property of a molecule is good and the hot melt to the polyester cord is easy in the heat treatment during the adhesive treating step as compared with the resol type condensate having mainly a three-dimensional network molecule, and the surface of the cord is easily wetted owing to the low molecular weight (low nucleus-number body) and further the diffusion is facilitated by well mixing with contaminants left on the surface such as various oiling agents used in the spinning of polyester to make the adhesion strong. Furthermore, the novolak condensate is dissolved and diffused in the adherend rubber to strengthen the adhesion and reinforce the surrounding rubber composition, so that when cracks and the like are created in the adherend rubber, the growth of cracks into the adhesive layer hardly occurs. Moreover, the novolak condensate acts as an adhesion/tackiness imparting resin (tackifier) even in the adhesive layer to provide aggregation force and tackiness of the adhesive layer so as to increase adhesion force.

Moreover, in the literature Class et al points out that from the measurement of dynamic mechanical properties of rubber/resin system, the effect of tackifier depends upon the solubility of a resin into a rubber based on its chemical structure and molecular weight and when the compatibility is small, the separation of rubber/resin is caused at a low concentration and hence the tacking effect is insufficient.(see J. Appl. "Polymer Sci.". 30. page 805, "Pressure-sensitive adhesive", page 166).

The inventors have made various studies with respect to thermosetting resins, particularly resorcin-formaldehyde resin to be added to Vp-St-Bd type sequential copolymer rubber latex and found that a low nucleus number body of straight chain novolak type molecule having a molecular weight distribution consisting mainly of 2–4 nuclei connecting bodies is effective as a tackifier.

Further, in general, it is favorable that the ratio of an adhesion/tackiness imparting resin to rubber component by volume is usually 66–150 to 100 of rubber (see page 138 of the above "pressure-sensitive adhesive") when the resin has a good compatibility with rubber. As the compatibility of the resin used as a tackifier becomes smaller, the separation of rubber/resin is apt to be caused, so that the preferable range shifts to a lower concentration.

In the invention, it has been found that the solid content of the thermosetting resin comprised of a resol type condensate and a novolak type condensate is 14–205 parts by weight, preferably 38–115 parts by weight based on 100 parts by weight as a solid content of the rubber latex as previously mentioned.

When the adhesive composition is comprised only of a novolak condensate and a rubber latex, however, there is caused contamination to the treating machine due to cohesion during a treating step of applying an adhesive composition to a cord, whereby application of adhesive becomes ununiform and the adhesion force is undesirably lowered.

When the adhesive composition is comprised of a resol type condensate, a rubber latex (RFL) and a novolak condensate, therefore, it is possible to avoid the occurrence of gum-up characteristic of a rubber latex. In this respect, the use of the resol type condensate is necessary.

A resol type condensate can also be obtained by using a novolak condensate as a starting material and mixing with rubber latex, an alkali and formalin in the presence of a base (see "Emulsion Handbook", p777, printed by Taiseisha). In this case, the molecular weight of the above novolak condensate is further increased by forming a three-dimensional network to result in a resol-forming reaction product.

In general, the amount of a resol type condensate compounded to a rubber latex is usually about 7–35 parts by weight based on 100 parts by weight as a solid content of the rubber latex, e.g. Vp-St-Bd copolymer rubber latex. When the amount exceeds 40 parts by weight, the compatibility of the adhesive layer to the adherend rubber becomes insufficient due to the hardening of the adhesive layer and the heat treatment at vulcanization step and hence the adhesion force between the adhesive layer and the adherend rubber considerably lowers. This was the same for the rubber latex used in the invention.

Further, the reason why the novolak condensate is added to the RFL solution is due to the fact that when the addition is carried out during the reaction of forming the resol type condensate, the novolak condensate is rendered into higher molecular weight and three-dimensional network and hence the effect as an adhesion promoter becomes small.

The addition is possible at a time just before and after the substantial completion of the reaction of forming the resol type condensate. During the resol-forming reaction, pH is temporarily lowered due to the formation of methylol group as a reaction intermediate, but as the condensation reaction proceeds, the methylol group is consumed to again heighten pH and pH is approximately constant at the completion of the reaction. In the invention, therefore, the addition is carried out by checking such a pH change as an indication.

And also, a feature of the invention is that [(amount of resol type condensate)+(amount of novolak condensate)] compounded is in an amount of 14–205 parts by weight based on 100 parts by weight as a solid content of the rubber latex. Particularly, the preferable compounding range of 38–115 parts by weight is clearly larger than the compounding amount of resorcin-formaldehyde condensate or thermosetting resin compounded in Vp-St-Bd copolymer latex obtained by two-stage polymerization in the conventional patent articles (JP-A-58-2370, JP-A-60-92371, JP-A-60-96674, JP-A-60-96675, JP-A-3-163181 and the like).

If the compounding amount of the resin can be made large in the adhesive composition, it is favorable because the bonding to the fiber is strong, but the compatibility of the adhesive composition to the adherend rubber at the boundary between the adhesive layer and the adherend rubber is small and the adhesion force lowers.

The resol type condensate is a polymer of three-dimensional network structure, while the novolak type condensate used in the invention has a low molecular weight straight-chain and is better in both the diffusion property and compatibility of molecule chain, so that the amount of the resin compounded into the adhesive composition can be increased without damaging the compatibility between the adhesive layer and the adherent rubber.

From the above reasons, according to the invention, the compounding is possible in a higher mixing ratio which has never been attained in the conventional technique, in which the amount of the thermosetting resin is not less than 35 parts by weight based on 100 parts by weight of the rubber latex.

Further, the reason why the composition ratios in the copolymer component (a') and the copolymer component (b') constituting the sequential copolymer particles of the rubber latex differ from each other is as follows.

That is, the conjugated diene compound component giving double bond to the particle generates a cross-linking reaction through a crosslinking agent mainly migrated and diffused from the adherend rubber in the vulcanization step or under the other use at higher temperature, and shows the following actions as a result of the crosslinking:

Firstly, the change of volume and modulus in the adhesive layer before and after the crosslinking is caused by the crosslinking. The larger such a change, the lower the durability of adhesion force. The cross-linking reaction particularly proceeds at a high temperature, so that the adhesion deterioration at a high temperature becomes larger. From this respect, therefore, it is favorable that the amount of the conjugated diene compound component is smaller.

Secondly, the adhesive layer and the adherend rubber are compatibilized by heat at an initial stage of the vulcanization to entangle and crosslink the particles and the polymer in the adherend rubber, whereby a boundary bonding force between the adhesive layer and the adherend rubber is obtained. From this respect, therefore, the conjugated diene compound component is necessary.

Considering these actions, Vp-St-Bd copolymer rubber latex of the conventional simple composition structure having a butadiene content of about 70% by weight has widely been used.

The rubber latex particles comprised only of the copolymer component (a') having a low content of conjugated diene compound are less in the influence of volume-modulus change through the crosslinking and can be expected the action of improving the durability of adhesion force, but the mixing between molecular chain of the copolymer in the particle and the molecular chain of the adherend rubber becomes difficult due to the compatibilization to the adherend rubber. Since the content of the conjugated diene compound is less, the crosslinking is less and the boundary bonding force between the adhesive layer and the adherend rubber is small, so that the adhesion level lowers. Particularly, when the content of the conjugated diene compound is not more than 40% by weight, the compatibilization of the particles with the adherend rubber becomes considerably small and the boundary bonding force is hardly generated and there is a problem that the adhesion breakage easily occurs between the adhesive and the adherend rubber.

In order to improve the adhesion force and to prevent the lowering of the adhesion force at a high temperature, therefore, according to the invention, the structures of both the copolymer component (b') having the conventional conjugated diene compound content (about 70% by weight) and the copolymer component (a') having less conjugated diene content is formed in the same particle.

That is, the particles obtained by sequentially polymerizing the monomer mixture (a) having less content of conjugated diene compound and the monomer mixture (b) having the conventional level content of conjugated diene compound can improve the adhesion force, particularly the heat-resistant durability because the copolymer particle are entangled with a molecular chain of rubber polymer at an initial vulcanization stage and co-vulcanize in the portion of the copolymer component (b') of the rubber latex particle and hence provide a boundary bonding force between adhesive and adherend rubber equal to the conventional one, and at the same time the content of conjugated diene compound in the whole of rubber latex particles is decreased and hence the influence of volume and modulus changes accompanied with the crosslinking reaction becomes less when thermal input is high temperature or long time during the vulcanization, product use or the like.

In the invention, 2-vinylpyridine, 3-vinylpyridine, 4-vinylpyridine, 2-methyl-5-vinylpyridine, 5-ethyl-2-vinylpyridine and the like are mentioned as a pyridine ring containing vinyl compound, one or two or more of which may be used. Preferably, it is 2-vinylpyridine.

As the unsubstituted-substituted styrene, mention may be made of styrene, α-methylstyrene, 2-methylstyrene, 3-methylstyrene, 4-methylstyrene, 2,4-diisopropyl styrene, 2,4-dimethylstyrene, 4-t-butylstyrene, hydroxymethyl styrene and the like, one or two or more of which may be used.

Preferably, it is styrene.

As the aliphatic vinyl compound, mention may be made of ethylenically unsaturated acid monomer such as acrylic acid, methacrylic acid or the like; ethylenically unsaturated acid anhydride monomer such as anhydrous maleic acid or the like; ethylenically unsaturated acid ester monomer such as methyl methacrylate or the like; aliphatic vinyl compound monomer such as ethylene, acrylonitrile, vinyl chloride or the like, one or two or more of which may be used.

As the conjugated diene compound, mention may be made of aliphatic conjugated diene compound monomer such as 1,3-butadiene, 2-methyl-1,3-butadiene and the like, one or two or more of which may be used.

Preferably, it is 1,3-butadiene.

In the monomer mixture (a) of the Vp-St-Bd type copolymer rubber latex according to the invention, when the content of pyridine ring containing vinyl compound is less than 3% by-weight, the adhesion force of the adhesive composition as a whole undesirably lowers, while when it exceeds 25% by weight, the vulcanization reaction of the latex is undesirably promoted.

When the content of unsubstituted.substituted styrene or unsubstituted.substituted styrene and aliphatic vinyl compound is less than 25% by weight, the strength of the rubber latex particle lowers and the strength of the adhesive layer lowers and hence the lowering of the adhesion force is brought about. When it exceeds 80% by weight, the rubber latex particle is too hard and the flexibility lowers and the lowering of the adhesion force when the product is used under high strain becomes remarkable.

When the content of conjugated diene compound is less than 5% by weight, the crosslinking is insufficient and the adhesion force lowers. When it exceeds 60% by weight, the crosslinking is excessive and the heat resistance undesirably lowers.

In the monomer mixture (b), when the content of pyridine ring containing vinyl compound is less than 5% by weight, the adhesion force of the adhesive layer as a whole lowers likewise the above case. When it exceeds 25% by weight, the adhesive becomes undesirably brittle.

When the content of unsubstituted or substituted styrene or unsubstituted or substituted styrene and aliphatic vinyl compound is less than 5% by weight, a lowering of strengths of the rubber latex particle and the adhesive layer is caused and the adhesion force lowers. When it exceeds 45% by weight, the co-vulcanizability between adhesive layer and adherend rubber lowers and the adhesion force also undesirably lowers.

When the content of conjugated diene compound is less than 40% by weight, the crosslinking is insufficient and the adhesion force lowers. When it exceeds 83% by weight, the adhesion force undesirably lowers.

As long as the weight ratio of the copolymer component (a') to the copolymer component (b') is 10/90–80/20, three or more kinds of monomer mixtures may be sequentially polymerized.

The weight ratio of the copolymer component (a') to the copolymer component (b') is defined to be 10/90–80/20, if the weight ratio of the copolymer (a') is too small, the effect of improving the heat-resistant adhesion force as compared with the conventional product of Vp-St-Bd copolymer rubber latex is slight. If the content of copolymer (a') is too large, the initial adhesion force lowers.

The composition of the produced rubber latex particle can be determined by a method of measuring a polymer composition ratio from an peak area of a chart obtained through NMR (nuclear magnetic resonance) process, a method of measuring a viscoelastic behavior of a polymer to determine a polymer composition ratio from loss thereof, and the like.

Further, two-phase structure of copolymers having different staining degrees in the particle is observed by means of an electron microscope after staining the rubber latex with osmium.

Also the reason why the solid content of Vp-St-Bd type sequential copolymer according to the invention in the rubber latex is required to be not less than 20% by weight in the rubber latex solid content is due to the fact that when it is less than the above value, the effect by using this latex can not be obtained.

The preparation of the latex according to the invention is carried out by the well-known sequential polymerization process. As the sequential polymerization process, there are, for example, a two-stage polymerization process, a power feed polymerization process and the like. Further, the addition method of the monomer is not particularly restricted and there may be used siamese addition, divisional addition, continuous addition or the like as long as the method can provide a latex containing both the copolymer (a') and the copolymer (b') in its one particle as in the invention.

Concretely, an emulsifying agent such as potassium rhodinate or the like is added to water, to which is added the monomer mixture (a) or (b). Further, an electrolyte such as sodium phosphate or the like and an initiator such as peroxide or the like are added to conduct polymerization. After a given conversion is attained, the other monomer mixture (b) or (a) is added to continue the polymerization.

After a given conversion is obtained, a charge transferring agent is added to stop the polymerization and then the remaining monomer is removed to obtain rubber latex having a structure comprised of polymers having different composition ratios.

As the novolak condensate, use may be made of commercially available products (e.g. Penacolite R50, trade name, made by Indospec Co., Ltd, Sumikanol 700(s), trade name, made by Sumitomo Chemical Co., Ltd.) and a synthetic product obtained by the following method.

That is, resorcin is dissolved in water and added with formaldehyde, which is subjected to a heat treatment at a certain temperature within a range of 100°–110° C. for a certain time within a range of 6–8 hours to obtain a reaction product.

These condensates may be used alone or in admixture of two or more. Further, a novolak condensate between phenolic derivative other than resorcin and formaldehyde may be used.

The novolak condensates having different molecular weight distributions were prepared by a method described in examples as mentioned later in which low molecular weight compounds such as resorcin monomer, two-nucleus resorcin-formaldehyde condensate and the like are mainly extracted from the resulting reaction product by an extraction with a solvent such as toluene, xylene or the like.

The molecular weight distribution of these novolak condensates can be measured by an area ratio through GPC.

When the solid content of the thermosetting resin is less than 14 parts by weight based on 100 parts by weight as a solid content of the copolymer rubber latex according to the invention, the adhesion force between the adhesive composition and the polyester material or the like lowers. When it exceeds 205 parts by weight, the adhesion force between the adhesive composition and the adherend rubber undesirably lowers. Furthermore, the content of less than 38 parts by weight or exceeding 115 parts by weight is undesirable because it comes out from a favorable range of either of the compounding amounts of the novolak condensate and the resol type condensate constituting the thermosetting resin. When it is within a range of 38–115 parts by weight, the balance among the rubber latex and both the condesates is attained and the effect of the invention is remarkable.

As long as the solid content of the thermosetting resin is within a range of 14–205 parts by weight based on 100 parts by weight of the rubber latex solid content, thermosetting resin component other than resorcin-formaldehyde condensate, or a resorcin-formaldehyde resin containing a third component may be added, if necessary.

In each of the monomer mixture (a) and the monomer mixture (b), the aliphatic vinyl compound is favorable to be not more than 15% by weight. When it exceeds the above value, the content of unsubstituted or substituted styrene is decreased to reduce the effect of the invention. Further, when the aliphatic vinyl compound is not more than 5% by weight, the effect of the invention is more clearly obtained.

The reason why the content of conjugated diene compound in the monomer mixture (b) is defined to be higher than that of the monomer mixture (a) is due to the fact that the adhesion property is poor in the reverse case.

In the invention, not more than 80% by weight of a component other than the sequential copolymer according to the invention may be included in the rubber latex component. As such a component, mention may be made of vinylpyridine-conjugated diene compound copolymer latex and its carboxy-modified latex, styrene-butadiene copolymer latex and its modified latex, acrylonitrile-butadiene copolymer latex and its modified latex, natural rubber latex, acrylic ester copolymer latex and the like, one or two or more of which may be included.

When such a component is not Vp-St-Bd type copolymer obtained by polymerization of a monomer mixture satisfying the composition range of the monomer mixture (b), if the content is not more than 70% by weight, the effect of the invention is clearer and is favorable.

When the content as a solid content of the resol type condensate under the mixing with the rubber latex is less than 4 parts by weight based on 100 parts by weight of the rubber latex solid content, the tackiness is high and in the course of applying the adhesive composition to the cord, the contamination to treating machine is caused and hence the adhesion force tends to lower because the adhesive can not be applied well. When it exceeds 35 parts by weight, the adhesion between the adherend rubber and the adhesive layer tends to lower undesirably. Particularly, when it is not less than 8 parts by weight but not more than 15 parts by weight, the tackiness of the adhesive applied to the polyester cord or the like is optimum and the cohesion to jig or machine or between mutual cords and the like after lapsed for a long time can be controlled and further the state of the adhesive-surface is good and a high adhesion force is obtained.

Further, when the content as a solid content of the novolak condensate is less than 10 parts by weight based on 100 parts by weight of the rubber latex solid content, the adhesion promoting effect to the adhesion force is slight. When it exceeds 170 parts by weight, the adhesion between the adhesive composition and the adherend rubber undesirably lowers. Particularly, the content of not less than 30 parts by weight but not more than 100 parts by weight is favorable because the adhesion promoting effect is remarkable.

The resol type condensate is preferable to be obtained under the mixing with the rubber latex in the resol-forming reaction, which is to lower the tackiness of the adhesive composition to control the occurrences of scale and gum-up at the adhesion treating step.

A method of mixing starting materials of resorcin-formaldehyde condensate (resorcin, relatively low molecular weight resorcin-formaldehyde condensate, formalin) with latex in the presence of an alkali solution, a method of starting a resol-forming reaction of the starting materials for the resorcin-formaldehyde condensate in the presence of an alkali solution without mixing with latex at the start of the reaction and mixing the reaction intermediate of a low condensing degree with latex at an initial reaction stage to continue the reaction, and the like are generally used as the method of reacting a resorcin-formaldehyde condensate obtained by the resol formation with rubber latex, in which the mixing with the rubber latex is conducted before the completion of the condensation reaction of the resol type resorcin-formaldehyde condensate (the judging method is mentioned above).

It is favorable that the novolak condensate is added to RFL solution as an adhesion promoter, which is to prevent a further polymerization of novolak condensate to gain molecular weight and maintain the function as an adhesion promoter as previously mentioned.

As a result of various studies with respect to the novolak condensate, it has been confirmed that when the area ratio of 2–4 resorcin nuclei connected component is not less than 40%, preferably not less than 50% through GPC analysis of the resin, the adhesion force is good and also the peak area ratio of monomer of not more than 25% through the same GPC analysis is favorable for maintaining the adhesion force inclusive of heat resistance.

As the content of 5 or more nuclei connecting component becomes more, the water solubility of the resin tends to lower the formation of higher molecular weight polymer, and also the diffusibility of the resin in the adhesion forming course lowers to make the adhesion effect small. Further, the aggregation force of the rubber latex becomes large and the elasticity of the adhesive increases to improve the durability, but the tackiness lowers and the adhesion effect tends to be made small.

An adhesive treated polyester cord can be prepared by applying the adhesive composition of the above construction to a cord or the like, such as a polyester cord and subjecting it to an adequate heat treatment.

The thus obtained cord is embedded in an uncured rubber and vulcanized, whereby the cord can strongly be adhered to the rubber.

As methods of applying the adhesive composition to a cord, there are a method of immersing the cord in an adhesive composition, a method of applying an adhesive composition with a brush, a method of spraying an adhesive composition and the like, from which an adequate method may be selected, if necessary.

It is favorable that a heat treatment following to the drying is carried out at a temperature above the glass transition temperature of a polymer in the cord, preferably at a temperature of not lower than [melting point of the polymer −70° C.] but not higher than [melting point −2°− C.].

When the temperature is lower than the glass transition temperature of the polymer, the molecular motion of the polymer is poor and the sufficient interaction between the polymer and the adhesion/tackiness imparting resin in the adhesive composition is not attained. Hence sufficient bonding force between the adhesive composition and the cord is not obtained.

Further, when the temperature exceeds [melting point of polymer −20° C.], there is a tendency of degrading the fiber material and the rubber latex in the adhesive composition.

The adhesive composition according to the invention is preferable to be applied to polyester materials. The polyester is a polymer having ester bond in its main chain, in which not less than 80% of the bonding form of repeating unit in the main chain is an ester bonding form for further details.

Such a polyester is obtained by condensing through an esterification reaction or an ester interchange reaction between a glycol such as ethylene glycol, propylene glycol, butylene glycol, methoxypolyethylene glycol, pentaerythritol or the like and a dicarboxylic acid such as terephthalic acid, isophthalic acid or a dimethyl ester thereof.

The most exemplified polyester is polyethylene terephthalate.

Such polyester materials may take any form of cord, cable, filament, filament chip, cord fabric, canvas and the like. Further, they may be subjected to a pretreating step such as treatment with electron ray, microwave, corona discharge, plasma or the like.

The adhesive composition according to the invention can be applied to not only the polyester fiber as mentioned above but also all materials represented by rayon, vinylon, aliphatic polyamide fibers such as 6-nylon, 6,6-nylon, 4,6-nylon or the like, aromatic polyamide fiber such as paraphenylene terephthalamide or the like, carbon fiber and glass fiber.

Further, the adhesive composition according to the invention can be applied to fibers such as polyester fiber, aromatic polyamide fiber, carbon fiber and the like treated with an epoxy compound or an isocyanate compound in or after the polymerization-spinning step, or fiber materials previously worked through a treatment with electron ray, microwave, plasma or the like.

As to the form of these fiber materials, use may be made of cord, cable, filament, filament chip, cord fabric, canvas and the like.

The adhesive composition according to the invention is applicable to any rubber articles such as tires, conveyor belts, belts, hoses, air springs and the like.

The invention will be described with reference to examples and comparative examples below.

The concentration of solid content in the examples was measured according to the method of measuring nonvolatile content of adhesive in the measurement of "other adhesives" of JIS K6833.

(1) Preparation of Vp-St-Bd type sequential copolymer rubber latex (A) Preparation of rubber latex used in Comparative Examples 1–33 and Examples 1–42

The Vp-St-Bd type copolymer rubber latex used in Comparative Examples 1–33 and Examples 1–42 is prepared by charging and dissolving 130 parts by weight of deionized water and 4.0 parts by weight of potassium rhodinate in an autoclave of 5 liters in capacity purged with nitrogen and provided with a stirrer.

To the resulting solution are added monomer mixtures having compositions as mentioned below and t-dodecylmercaptan to conduct polymerization and the concentration is adjusted to obtain a rubber latex having a solid content concentration of 40%.

(i) Preparation of rubber latex used in Comparative Examples 3–5, 7–11, 17, 19–26 and Examples 1–7, 9–34 and 40–42

A monomer mixture (a) having a composition shown in Tables 5–9 and 11 and 0.2 part by weight of t-dodecylmercaptan as a chain transfer agent are charged and emulsified. Thereafter, the temperature is raised to 50° C. and then 0.5 part by weight of potassium persulfate is added to start polymerization. After the conversion of the monomer mixture (a) reaches 80–90%, a monomer mixture (b) shown in Tables 5–9 and 11 and 0.2 part by weight of t-dodecylmercaptan are added to continue polymerization. After the conversion reaches 95%, 0.1 part by weight of hydroquinone is added to stop the polymerization. Then, unreacted monomers are removed under a reduced pressure to obtain a copolymer rubber latex.

(ii) Preparation of rubber latex used in Comparative Example 6 and Example 8

A monomer mixture (b) shown in Table 6 and 0.2 part by weight of t-dodecylmercaptan are charged and emulsified. Thereafter, the temperature is raised to 50° C. and 0.5 part by weight of potassium persulfate is added to start the polymerization. After the conversion of the monomer mixture (b) reaches 80–90%, a monomer mixture (a) shown in Table 6 and 0.2 part by weight of t-dodecylmercaptan are added to continue the polymerization. After the conversion reaches 95%, 0.1 part by weight of hydroquinone is added to stop the polymerization. Then, the unreacted monomers are removed under a reduced pressure to obtain a copolymer rubber latex.

(iii) Preparation of rubber latex used in Comparative Examples 1, 2, 12 and 13

A monomer mixture having a composition shown in Tables 5 and 7 and 0.55 part by weight of t-dodecylmercaptan are charged and emulsified. Thereafter, the temperature is raised to 50° C. and 0.5 part by weight of potassium persulfate is added to start the polymerization. After the conversion reaches 90%, 0.1 part by weight of hydroquinone is added to stop the polymerization. Then, the unreacted monomers are removed to obtain a copolymer rubber latex.

(iv) Preparation of rubber latex used in Comparative Examples 15, 18 and 31–33

A monomer mixture having a composition shown in Tables 7, 8 and 11 and 0.40 part by weight of t-dodecylmercaptan are charged and emulsified. Thereafter, the temperature is raised to 50° C. and 0.5 part by weight of potassium persulfate is added to start the polymerization. After the conversion reaches 90%, 0.1 part by weight of hydroquinone is added to stop the polymerization. Then, the unreacted monomers are removed to obtain a copolymer rubber latex.

(v) Preparation of rubber latex used in Comparative Example 14

The rubber latex of Comparative Example 1 (or Comparative Example 12) prepared in the item (iii) is mixed with the rubber latex of Comparative Example 18 at a weight ratio of 90 parts by weight to 10 parts by weight.

(vi) Preparation of rubber latex used in Comparative Example 16

The rubber latex of Comparative Example 1 (or Comparative Example 12) prepared in the item (iii) is mixed with the rubber latex of Comparative Example 18 at a weight ratio of 30 parts by weight to 70 parts by weight.

(vii) Preparation of rubber latex used in Comparative Example 30

There is used a styrene-butadiene copolymer rubber latex made by Japan Synthetic Rubber Co., Ltd. (trade name: JSR2108, solid content concentration: 40%).

(viii) Preparation of rubber latex used in Examples 35–37

The Vp-St-Bd type sequential copolymer rubber latex of Example 1 prepared in the item (i) and the styrene-butadiene copolymer rubber latex (SBR latex) of Comparative Example 30 are mixed at a composition ratio shown in Table 10.

(ix) Preparation of rubber latex used in Comparative Examples 27–29

The Vp-St-Bd type copolymer rubber latex of Comparative Example 1 prepared in the item (iii) and the above SBR latex are mixed at a composition ratio shown in Table 10.

(x) Preparation of rubber latex used in Examples 38 and 39

The Vp-St-bd type sequential copolymer rubber latex of Example 1 prepared in the item (i) and the Vp-St-Bd copolymer rubber latex of Comparative Example 1 prepared in the item (iii) are mixed at a composition ratio shown in Table 10.

(B) Preparation of rubber latex used in Example 43 and Comparative Example 34

The Vp-St-Bd type copolymer rubber latex used in Example 43 and Comparative Example 34 is prepared by charging 130 parts by weight of deionized water, 7.0 parts by weight of polyoxyethylene lauryl ether and 0.05 part by weight of sodium ethylenediamine tetraacetate in an autoclave of 5 liters in capacity purged with nitrogen and provided with a stirrer. To the resulting mixture are added monomer mixtures having compositions as mentioned below and t-dodecylmercaptan to conduct polymerization and the concentration is adjusted to obtain a rubber latex having a solid content concentration of 40%.

(i) Preparation of latex used in Example 43

A monomer mixture (a) having a composition shown in Table 11 and 0.2 part by weight of t-dodecylmercapatn are charged and emulsified. Thereafter, the temperature is raised to 50° C. and 0.5 part by weight of potassium persulfate is added to start polymerization. After the conversion of the monomer mixture (a) reaches 80–90%, a monomer mixture (b) having a composition shown in Table 11 and 0.15 part by weight of t-dodecylmercaptan are added to continue the polymerization. After the conversion reaches 95%, 0.1 part by weight of hydroquinone is added to stop polymerization. Then, the unreacted monomers are removed under a reduced pressure to obtain a copolymer rubber latex.

(ii) Preparation of rubber latex used in Comparative Example 34

A monomer mixture having a composition shown in Table 11 and 0.35 part by weight of t-dodecylmercapatn are charged and emulsified. Thereafter, the temperature is raised to 50° C. and 0.5 part by weight of potassium persulfate is added to start the polymerization. After the conversion reaches 95%, 0.1 part by weight of hydroquinone is added to stop polymerization. Then, the unreacted monomers are removed under a reduced pressure to obtain a copolymer rubber latex.

(2) Preparation of a composition comprised of resol type condensate and rubber latex mixture (i) Preparation of Examples 1–8, 10–43, Comparative Examples 1–4, 6, 8–34

The rubber latex obtained in the item (1) and a mixed solution of starting materials for resol type condensate having a composition shown in Table 1 are mixed at a composition ratio shown in Table 1 and matured at 25° C. for 24 hours to obtain a composition comprised of the rubber latex and the resol type condensate.

(ii) Preparation of Example 9, Comparative Example 7

A mixed solution of starting materials for resol type condensate having a composition shown in Table 1 is prepared and left to stand at 25° C. for 8 hours and then mixed with given parts by weight of the rubber latex obtained in the item (1), which is matured at 25° C. for 16 hours to obtain an RFL solution.

(3) Preparation of novolak type condensate

As the novolak condensate, there are used commercially available products (Penacolite R50, trade name, made by Indospec Co., Ltd. Sumikanol 700(s), trade name, made by Sumitomo Chemical Co., Ltd.) and synthetic products obtained by the following methods (Examples 3–7).

That is, 100 parts by weight of resorcin and 16.3 parts by weight of water are charged into a reaction device provided with a thermometer, a stirrer, a reflux condenser and a dropping funnel and dissolved at room temperature, to which is added dropwise 97.7 parts by weight of 37% formalin over 0.5 hour with stirring at 110° C. and further the stirring is continued for 6.0 hours. After the cooling to 90° C., 1.3 parts by weight of an aqueous solution of 1N ammonia is added as a pH adjusting agent for restraining the reaction to adjust pH to about 4 and then cooled to room temperature to obtain a novolak condensate shown in Example 3 of Table 5.

In order to prepare novolak type condensates of Examples 4, 5, 6 having different molecular weight distributions from the novolak type condensate obtained by the above condensation reaction, monomer and low molecular weight component are extracted with toluene. In order to raise the extraction efficiency in these examples, the novolak condensate obtained by the above condensation reaction is condensed (azeotropic distillation) and then extracted at a temperature of 106° C.

That is, 100 parts by weight of an aqueous solution of the above condensation reaction product and 200 parts by weight of toluene are charged into an azeotropic distillation/extraction device provided with a thermometer, a stirrer, a Dean-Stark type trap, a Liebig condenser, and a reflux condenser and raised to a temperature of 90° C. and thereafter water is distilled off from the aqueous solution of the novolak condensate through azeeotropic distillation and condensed until the azeotropic temperature is 106° C. Thereafter, the stirring is continued for 60 minutes while holding the temperature of 106° C. and the reaction mass is left to stand for 5 minutes, whereby toluene layer and water layer are separated, which are decantated to remove about 195 parts by weight of toluene extracting resorcin and low molecular weight resorcin-formaldehyde condensate.

In this case, toluene is distilled off by distillation, whereby there can be obtained novolak type condensate shown in Example 4 of Table 5.

In case of preparing novolak type condensate having a different molecular weight distribution shown in Example 5 of Table 5, however, distillation is not carried out, but the following extraction operation is continued and then toluene is distilled off by distillation.

That is, 100 parts by weight of toluene is again added and stirred at 106° C. for 60 minutes and left to stand for 5 minutes and the toluene extracted layer is removed by decantation.

Moreover, the condensate having a smaller content of low molecular weight component shown in Example 6 of Table 5 can be obtained by further repeating the above extraction operation 2 times and distilling off toluene by distillation.

And also, the composition of Example 7 reducing high molecular weight component (5 or more nuclei bodies) as compared with that of the novolak condensate of Example 6 can be obtained by utilizing precipitation with a low temperature water as mentioned below because the solubility of the novolak condensate in water is poor as the molecular weight becomes large.

That is, the novolak type condensate of Example 6 is heated to 95° C. and diluted with 100 parts by weight of water of 95° C., which is cooled to 5° C. and left to stand over a day to settle down the precipitate and then a novolak condensate with a higher molecular weight is obtained through decantation of the supernatant liquid.

The molecular weight distributions of these novolak type condensates are measured by the following method by means measuring permeation chromatograph measuring machine [made by TOSOH, trade name: HLC-8020].

A sample of 2 μl is injected from a solution obtained by adding 10 ml of tetrahydrofuran to 32 mg of an aqueous solution of the novolak condensate through a syringe and passes with tetrahydrofuran (first class grade chemical) as a carrier solvent at a flowing rate of 1 ml/min and at an atmosphere temperature of 40° C. through a column of G2000HxL, and then a molecular weight pattern of elute is measured by an RI detector. As a typical example, amount of each nuclei connecting body is determined from the corresponding area of GPC chart shown in FIG. 1 as follows.

(a) Peaks of nuclei connecting bodies in the obtained GPC waveform are monomer M, 2 nuclei connecting body D, 3 nuclei connecting body T, 4 nuclei connecting body Q and 5 or more nuclei connecting body P from the low molecular weight side.

(b) A base line (x) is formed by connecting the lower side foot of the peak for lowest molecular weight component and the higher side foot of the peak for highest molecular weight component.

(c) A normal line (y) is drawn from a valley (bottom portion) between the peaks in the waveform showing each molecular weight to the base line, which is a boundary between adjacent nuclei bodies.

(d) The percentage of each area corresponding to each nucleus body to the total area (area of M+D+T+Q+P), which is a content of each nucleus body.

Moreover, the solid content concentration of the aqueous solution of novolak condensate in the commercially available products and the synthetic products were measured by the aforementioned method, and if necessary, water is added so as to adjust the solid content concentration into 50% (in this case, water is added at a temperature of 95° C. and cooled to room temperature).

(4) Preparation of adhesive composition (i) Examples 1–43, Comparative Examples 1, 2, 9, 11–34

The novolak resorcin-formaldehyde condensate shown in Table 1 (solid content concentration: 50%) is rendered into an adhesion promoter solution by adjusting pH with a caustic soda solution having a composition shown in Table 2. This solution is added to RFL solution obtained in the item (2) at a composition shown in Table 1 to prepare an adhesive composition.

(ii) Comparative Example 4

An adhesive composition of Comparative Example 4 is prepared by forming a solution of resorcin in caustic soda having a composition shown in Table 3 and adding this aqueous solution to the RFL solution obtained in the item (2) at a composition shown in Table 1.

(iii) Comparative Example 5

An adhesive composition is prepared by forming a solution of novolak condensate having a solid content concentration of 50% in caustic soda having a composition shown i,n Table 2 and adding 350 parts by weight of this aqueous solution to 400 parts by weight of rubber latex obtained in the item (1).

(iv) Comparative Examples 3, 6, 7, 8, 10

As the adhesive compositions of Comparative Examples 3, 6, 7, 8, 10, there is used RFL solution prepared in the item (2) as it is.

(5) Preparation of cords treated with adhesive composition

As a polyester material, there are used polyethylene terephthalate tire cords having a twisting structure of 1500 d/2, ply twist number of 40 turns/10 cm and cable twist number of 40 turns/10 cm, which are immersed in the adhesive composition obtained in the item (4), dried at 150° C. for 1.5 minutes and treated in an atmosphere held at 240° C. for 2 minutes.

(6-1) Vulcanization I

The cords treated with the adhesive composition of the item (5) are embedded in an uncured rubber composition having a compounding recipe shown in Table 4 and vulcanized at 170° C. under a pressure of 20 Kg/cm$^2$ for 30 minutes.

(7-1) Measurement of initial adhesion force

The cord end is taken out of the vulcanizate obtained in the item (6-1) and the cord is peeled off therefrom at a velocity of 30 cm/min to measure a resisting force, which is an initial adhesion force. The results are shown in Tables 5–11.

(6-2) Vulcanization II

The cords treated with the adhesive composition of the item (5) are embedded in an uncured rubber composition having a compounding recipe shown in Table 4 and vulcanized at 190° C. under a pressure of 20 kg/cm$^2$ for 30 minutes.

(7-2) Measurement of heat-resistant adhesion force

The cord end is taken out of the vulcanizate obtained in the item (6-2) and the cord is peeled off therefrom at a velocity of 30 cm/min likewise the above case to measure a resisting force, which is a heat-resistant adhesion force. The results are shown in Tables 5–11.

(8) Tire durability

A radial tire for passenger car having a single-layer carcass ply using the treated cord obtained in the item (5) is prepared. The tire size is 185/70 R14.

The thus prepared tire is mounted onto a rim according to a method of 5.3.1 in JIS D4230 and then a total running distance till the breakage of the tire is measured by using a testing device of 5.3.2 in the same JIS while continuously increasing a load by 5% every 24 hours even after the completion of the third stage in a testing method of 5.3.3 in the same JIS procedure. A tire durability (A) is represented by an index in Tables 5–7 on the basis that the result using the adhesive composition of Comparative Example 3 is 100.

Next, polyethylene terephthalate tire cords having a twisting structure of 1500 d/2, ply twist number of 23 turns/10 cm and cable twist number of 23 turns/10 cm are prepared. Such cords are immersed in each of the adhesive compositions, dried at 150° C. for 1.5 minutes and subjected to an adhesion treatment by heating in an atmosphere held at 240° C. for 2 minutes.

A radial tire for passenger car having a two-layer belt ply is prepared by using the thus treated cord. The tire size is 1855R14.

The thus prepared tire is mounted onto a rim according to a method of 5.3.1 in JIS D4230 and then a total running distance until the breakage of the tire is measured by using a testing device of 5.3.2 in the same JIS and continuously increasing a speed by 10 km/h every 30 minutes even after the completion of fourth stage in a testing method of 5.4.3 in the same JIS. A high-speed tire durability (B) is represented by an index in Tables 5–7 on the basis that the result using the adhesive composition of Comparative Example 3 is 100.

Furthermore, polyethylene terephthalate tire cords having a twisting structure of 1500 d/2, ply twist number of 40 turns/10 cm and cable twist number of 40 turns/10 cm are prepared. Such cords are subjected to an adhesion treatment by immersing in each of the adhesive compositions, drying at 150° C. for 1.5 minutes and heating in an atmosphere held at 240° C. for 2 minutes.

A radial tire for small-size truck having a three-layer carcass ply is prepared by using the thus treated cord. The tire size is 6.50R15, 10PR (ply plating).

The thus prepared tire is mounted onto a rim according to a method of 5.3.1 in JIS D4230 and then a total running distance until the breakage of the tire is measured by using a testing device of 5.3.2 in the same JIS and continuously increasing a load by 10% every 24 hours even after the completion of third stage in a testing method of 5.3.3 in the same JIS. Tire durability (C) is represented by an index in Tables 5–7 on the basis that the result using the adhesive composition of Comparative Example 3 is 100.

TABLE 1(a)

| | Mixed solution of starting material for resol type condensate | | | | | | |
|---|---|---|---|---|---|---|---|
| Compounding chemical | soft water (—) | resorcin (100%) | formalin (37%) | ISC-R50 (50%) | aqueous caustic soda solution (10%) | Rubber latex solution (40%) | Adhesion promoter solution (novolak type condensate) <concentration differs depending upon examples> |
| Example 1 | 145.13 | 9.94 | 10.99 | — | 3.94 | 400.00 | 350.00 (ISC-R50) |
| Example 2 | 145.13 | 9.94 | 10.99 | — | 3.94 | 400.00 | 350.00 (SC-700S) |
| Examples 3–7 | 145.13 | 9.94 | 10.99 | — | 3.94 | 400.00 | 350.00 (synthesized product) |
| Example 8 | 145.13 | 9.94 | 10.99 | — | 3.94 | 400.00 | 350.00 (ISC-R50) |
| Example 9 | 141.84 | 9.94 | 10.99 | — | 7.23 | 400.00 | 350.00 (ISC-R50) |
| Example 10 | 131.75 | — | 5.01 | 24.29 | 8.95 | 400.00 | 350.00 (ISC-R50) |
| Example 11 | 123.91 | 5.68 | 6.28 | — | 4.13 | 400.00 | 350.00 (ISC-R50) |

TABLE 1(a)-continued

| Compounding chemical | Mixed solution of starting material for resol type condensate | | | | | | Adhesion promoter solution (novolak type condensate) <concentration differs depending upon examples> |
|---|---|---|---|---|---|---|---|
| | soft water (—) | resorcin (100%) | formalin (37%) | ISC-R50 (50%) | aqueous caustic soda solution (10%) | Rubber latex solution (40%) | |
| Example 12 | 189.68 | 21.29 | 23.54 | — | 15.49 | 400.00 | 350.00 (ISC-R50) |
| Example 13 | 145.13 | 9.94 | 10.99 | — | 3.94 | 400.00 | 350.00 (ISC-R50) |
| Example 14 | 145.13 | 9.94 | 10.99 | — | 3.94 | 400.00 | 350.00 (ISC-R50) |
| Example 15 | 145.13 | 9.94 | 10.99 | — | 3.94 | 400.00 | 350.00 (ISC-R50) |
| Examples 16~43 | 145.13 | 9.94 | 10.99 | — | 3.94 | 400.00 | 350.00 (ISC-R50) |

TABLE 1(b)

| Compounding chemical | Mixed solution of starting material for resol type condensate | | | | | | Adhesion promoter solution (novolak type condensate) <concentration differs depending upon examples> |
|---|---|---|---|---|---|---|---|
| | soft water (—) | resorcin (100%) | formalin (37%) | ISC-R50 (50%) | aqueous caustic soda solution (10%) | Rubber latex solution (40%) | |
| Comparative Example 1 | 145.13 | 9.94 | 10.99 | — | 3.94 | 400.00 | 350.00 (ISC-R50) |
| Comparative Example 2 | 145.13 | 9.94 | 10.99 | — | 3.94 | 400.00 | 350.00 (ISC-R50) |
| Comparative Example 3 | 145.13 | 9.94 | 10.99 | — | 3.94 | 400.00 | — |
| Comparative Example 4 | 145.13 | 9.94 | 10.99 | — | 3.94 | 400.00 | 350.00 (resorcin) |
| Comparative Example 5 | — | — | — | — | — | 400.00 | 350.00 (ISC-R50) |
| Comparative Example 6 | 145.13 | 9.94 | 10.99 | — | 3.94 | 400.00 | — |
| Comparative Example 7 | 141.84 | 9.94 | 10.99 | — | 7.23 | 400.00 | — |
| Comparative Example 8 | 131.75 | — | 5.01 | 24.29 | 8.95 | 400.00 | — |
| Comparative Example 9 | 219.57 | 28.39 | 31.39 | — | 20.65 | 400.00 | 350.00 (ISC-R50) |
| Comparative Example 10 | 351.57 | 59.61 | 65.92 | — | 43.37 | 400.00 | — |
| Comparative Example 11 | 145.13 | 9.94 | 10.99 | — | 3.94 | 400.00 | 1100.00 (SC-R50) |
| Comparative Examples 12~34 | 145.13 | 9.94 | 10.99 | — | 3.94 | 400.00 | 350.00 (SC-700S) |

*unit is parts by weight at wet
*numerical value in < > is a solid content concentration of a compounding chemical (aqueous solution).
*symbol in ( ) is a kind of novolak type condensate used.
*ISC-R50 is an abbreviation of Penacolite R50 made by Indospec Co., Ltd.
*SC-700S is an abbreviation of Sumikanol 700(s) made by Sumitomo Chemical Co., Ltd.
*A compounding composition of the adhesion promoter solution is shown in Table 2.

TABLE 2

| | Soft water | Aqueous caustic soda solution (10%) | Novolak type condensate (50%) |
|---|---|---|---|
| Examples 1~12, 16~43 Comparative Examples 1, 2, 5, 9, 12~34 | 199.72 | 10.28 | 140.00 |
| Example 13 | 57.02 | 2.94 | 40.00 |
| Example 14 | 342.37 | 17.63 | 240.00 |
| Example 15 | 485.03 | 24.97 | 340.00 |
| Comparative Example 11 | 627.69 | 32.31 | 440.00 |

*Compounding unit is parts by weight at wet.
*Numerical value in parenthesis is a solid content concentration.

TABLE 3

| Soft water | 269.72 parts by weight |
|---|---|
| Aqueous caustic soda solution (10%) | 10.28 parts by weight |
| Resorcin (100%) | 70.00 parts by weight |

*Compounding unit is parts by weight at wet.
*Numerical value in parenthesis is a solid content concentration.

TABLE 4

| Natural rubber | 80 parts by weight |
|---|---|
| Styrene-butadiene copolymer rubber | 20 parts by weight |
| Carbon black | 40 parts by weight |
| Stearic acid | 2 parts by weight |
| Petroleum softening agent | 10 parts by weight |

TABLE 4-continued

| | |
|---|---|
| Pine tar | 4 parts by weight |
| Zinc white | 5 parts by weight |
| N-phenyl-β-naphthylamine | 1.5 parts by weight |
| 2-benzothiazyldisulfide | 0.75 part by weight |
| Diphenyl guanidine | 0.75 part by weight |
| Sulfur | 2.5 parts by weight |

TABLE 5(a)

| | | | Comparative Example 1 | Comparative Example 2 | Comparative Example 3 | Comparative Example 4 | Comparative Example 5 | Example 1 |
|---|---|---|---|---|---|---|---|---|
| Rubber latex composition (% by weight) | Composition of monomer mixture (a) | 2-vinylpyridine | — | — | 12.5 | 12.5 | 12.5 | 12.5 |
| | | styrene | — | — | 60 | 60 | 60 | 60 |
| | | 1,3-butadiene | — | — | 27.5 | 27.5 | 27.5 | 27.5 |
| | Composition of monomer mixture (b) | 2-vinylpyridine | — | — | 15 | 15 | 15 | 15 |
| | | styrene | — | — | 15 | 15 | 15 | 15 |
| | | 1,3-butadiene | — | — | 70 | 70 | 70 | 70 |
| | Composition of rubber latex | copolymer weight ratio (a')/(b') | — | — | 60/40 | 60/40 | 60/40 | 60/40 |
| | particles as a whole | 2-vinylpyridine | 15 | 13.5 | 13.5 | 13.5 | 13.5 | 13.5 |
| | | styrene | 15 | 42 | 42 | 42 | 42 | 42 |
| | | 1,3-butadiene | 70 | 44.5 | 44.5 | 44.5 | 44.5 | 44.5 |
| Resol type condensate | Compounding amount *1 (parts by weight) | | 14 | 14 | 14 | 14 | — | 14 |
| Novolak type condensate | Kind | | ISC-R50 | ISC-R50 | (none) | resorcin | ISC-R50 | ISC-R50 |
| | Area ratio of GPC peaks (%) | monomer | 15.54 | 15.54 | — | 100.00 | 15.54 | 15.54 |
| | | 2 nucleus body | 17.46 | 17.46 | — | — | 17.46 | 17.46 |
| | | 3 nucleus body | 15.30 | 15.30 | — | — | 15.30 | 15.30 |
| | | 4 nucleus body | 12.44 | 12.44 | — | — | 12.44 | 12.44 |
| | | 5 or more nuclei bodies | 39.26 | 39.26 | — | — | 39.26 | 39.26 |
| | Compounding amount *1 (parts by weight) | | 70 | 70 | — | 70 | 70 | 70 |
| Initial adhesion force (kg/cord) | | | 1.63 | 1.05 | 1.92 | 0.69 | 0.86 | 2.67 |
| Heat-resistant adhesion force (kg/cord) | | | 0.98 | 0.49 | 1.67 | 0.55 | 0.81 | 2.33 |
| Tire durability (index) | (A) | | 90 | 85 | 100 | 85 | 90 | 115 |
| | (B) | | — | — | 100 | — | 90 | 110 |
| | (C) | | — | — | 100 | — | 90 | 115 |

TABLE 5(b)

| | | | Example 2 | Example 3 | Example 4 | Example 5 | Example 6 | Example 7 |
|---|---|---|---|---|---|---|---|---|
| Rubber latex composition (% by weight) | Composition of monomer mixture (a) | 2-vinylpyridine | 12.5 | 12.5 | 12.5 | 12.5 | 12.5 | 12.5 |
| | | styrene | 60 | 60 | 60 | 60 | 60 | 60 |
| | | 1,3-butadiene | 27.5 | 27.5 | 27.5 | 27.5 | 27.5 | 27.5 |
| | Composition of monomer mixture (b) | 2-vinylpyridine | 15 | 15 | 15 | 15 | 15 | 15 |
| | | styrene | 15 | 15 | 15 | 15 | 15 | 15 |
| | | 1,3-butadiene | 70 | 70 | 70 | 70 | 70 | 70 |
| | Composition of rubber latex | copolymer weight ratio (a')/(b') | 60/40 | 60/40 | 60/40 | 60/40 | 60/40 | 60/40 |
| | particles as a whole | 2-vinylpyridine | 13.5 | 13.5 | 13.5 | 13.5 | 13.5 | 13.5 |
| | | styrene | 42 | 42 | 42 | 42 | 42 | 42 |
| | | 1,3-butadiene | 44.5 | 44.5 | 44.5 | 44.5 | 44.5 | 44.5 |
| Resol type condensate | Compounding amount *1 (parts by weight) | | 14 | 14 | 14 | 14 | 14 | 14 |
| Novolak type condensate | Kind | | SC-700S | (synthesized product) | (synthesized product) | (synthesized product) | (synthesized product) | (synthesized product) |
| | Area ratio of GPC peaks (%) | monomer | 15.14 | 23.20 | 20.43 | 8.95 | 4.26 | 6.04 |
| | | 2 nucleus body | 17.06 | 19.40 | 19.31 | 20.78 | 21.35 | 30.81 |
| | | 3 nucleus body | 15.16 | 14.20 | 15.65 | 18.30 | 19.05 | 28.20 |
| | | 4 nucleus body | 10.73 | 9.80 | 12.77 | 14.46 | 14.52 | 20.96 |
| | | 5 or more nuclei bodies | 41.91 | 33.40 | 31.84 | 37.51 | 40.82 | 13.99 |
| | Compounding amount *1 (parts by weight) | | 70 | 70 | 70 | 70 | 70 | 70 |
| Initial adhesion force (kg/cord) | | | 2.58 | 2.30 | 2.44 | 2.67 | 2.49 | 2.81 |
| Heat-resistant adhesion force (kg/cord) | | | 2.25 | 2.05 | 2.11 | 2.28 | 2.13 | 2.44 |

TABLE 5(b)-continued

|  |  | Example 2 | Example 3 | Example 4 | Example 5 | Example 6 | Example 7 |
|---|---|---|---|---|---|---|---|
| Tire durability (index) | (A) | 110 | — | — | — | 110 | 120 |
|  | (B) | — | — | — | — | — | 115 |
|  | (C) | — | — | — | — | — | 120 |

*amount of solid content based on 100 parts as a solid content of rubber latex

TABLE 6(a)

|  |  |  | Comparative Example 6 | Example 8 | Comparative Example 7 | Example 9 | Comparative Example 8 | Example 10 |
|---|---|---|---|---|---|---|---|---|
| Rubber latex composition (% by weight) | Composition of monomer mixture (a) | 2-vinylpyridine | 12.5 | 12.5 | 12.5 | 12.5 | 12.5 | 12.5 |
|  |  | styrene | 60 | 60 | 60 | 60 | 60 | 60 |
|  |  | 1,3-butadiene | 27.5 | 27.5 | 27.5 | 27.5 | 27.5 | 27.5 |
|  | Composition of monomer mixture (b) | 2-vinylpyridine | 15 | 15 | 15 | 15 | 15 | 15 |
|  |  | styrene | 15 | 15 | 15 | 15 | 15 | 15 |
|  |  | 1,3-butadiene | 70 | 70 | 70 | 70 | 70 | 70 |
|  | Composition of rubber latex particles as a whole | copolymer weight ratio (a')/(b') | 60/40 | 60/40 | 60/40 | 60/40 | 60/40 | 60/40 |
|  |  | 2-vinylpyridine | 13.5 | 13.5 | 13.5 | 13.5 | 13.5 | 13.5 |
|  |  | styrene | 42 | 42 | 42 | 42 | 42 | 42 |
|  |  | 1,3-butadiene | 44.5 | 44.5 | 44.5 | 44.5 | 44.5 | 44.5 |
| Resol type condensate | Compounding amount *1 (parts by weight) |  | 14 | 14 | 14 | 14 | 14 | 14 |
| Novolak type condensate | Kind |  | (none) | ISC-R50 | (none) | ISC-R50 | (none) | ISC-R50 |
|  | Area ratio of GPC peaks (%) | monomer | — | 15.54 | — | 15.54 | — | 15.54 |
|  |  | 2 nucleus body | — | 17.46 | — | 17.46 | — | 17.46 |
|  |  | 3 nucleus body | — | 15.30 | — | 15.30 | — | 15.30 |
|  |  | 4 nucleus body | — | 12.44 | — | 12.44 | — | 12.44 |
|  |  | 5 or more nuclei bodies | — | 39.26 | — | 39.26 | — | 39.26 |
|  | Compounding amount *1 (parts by weight) |  | — | 70 | — | 70 | — | 70 |
| Initial adhesion force (kg/cord) |  |  | 1.78 | 2.46 | 1.86 | 2.33 | 1.91 | 2.65 |
| Heat-resistant adhesion force (kg/cord) |  |  | 1.61 | 2.10 | 1.35 | 2.13 | 1.70 | 2.24 |
| Tire durability (index) | (A) |  | — | 110 | — | 105 | — | — |
|  | (B) |  | — | 110 | — | — | — | — |
|  | (C) |  | — | 115 | — | — | — | — |

TABLE 6(b)

|  |  |  | Example 11 | Example 12 | Comparative Example 9 | Comparative Example 10 | Example 13 | Example 14 |
|---|---|---|---|---|---|---|---|---|
| Rubber latex composition (% by weight) | Composition of monomer mixture (a) | 2-vinylpyridine | 12.5 | 12.5 | 12.5 | 12.5 | 12.5 | 12.5 |
|  |  | styrene | 60 | 60 | 60 | 60 | 60 | 60 |
|  |  | 1,3-butadiene | 27.5 | 27.5 | 27.5 | 27.5 | 27.5 | 27.5 |
|  | Composition of monomer mixture (b) | 2-vinylpyridine | 15 | 15 | 15 | 15 | 15 | 15 |
|  |  | styrene | 15 | 15 | 15 | 15 | 15 | 15 |
|  |  | 1,3-butadiene | 70 | 70 | 70 | 70 | 70 | 70 |
|  | Composition of rubber latex particles as a whole | copolymer weight ratio (a')/(b') | 60/40 | 60/40 | 60/40 | 60/40 | 60/40 | 60/40 |
|  |  | 2-vinylpyridine | 13.5 | 13.5 | 13.5 | 13.5 | 13.5 | 13.5 |
|  |  | styrene | 42 | 42 | 42 | 42 | 42 | 42 |
|  |  | 1,3-butadiene | 44.5 | 44.5 | 44.5 | 44.5 | 44.5 | 44.5 |
| Resol type condensate | Compounding amount *1 (parts by weight) |  | 8 | 30 | 40 | 84 | 14 | 14 |
| Novolak type condensate | Kind |  | ISC-R50 | ISC-R50 | ISC-R50 | (none) | ISC-R50 | ISC-R50 |
|  | Area ratio of GPC peaks (%) | monomer | 15.54 | 15.54 | 15.54 | — | 15.54 | 15.54 |
|  |  | 2 nucleus body | 17.46 | 17.46 | 17.46 | — | 17.46 | 17.46 |
|  |  | 3 nucleus body | 15.30 | 15.30 | 15.30 | — | 15.30 | 15.30 |
|  |  | 4 nucleus body | 12.44 | 12.44 | 12.44 | — | 12.44 | 12.44 |
|  |  | 5 or more nuclei bodies | 39.26 | 39.26 | 39.26 | — | 39.26 | 39.26 |
|  | Compounding amount *1 (parts by weight) |  | 70 | 70 | 70 | — | 20 | 120 |
| Initial adhesion force (kg/cord) |  |  | 2.38 | 2.14 | 1.87 | 0.40 | 2.21 | 2.25 |
| Heat-resistant adhesion force (kg/cord) |  |  | 1.96 | 1.97 | 1.68 | 0.37 | 1.94 | 2.03 |

TABLE 6(b)-continued

|  |  | Example 11 | Example 12 | Comparative Example 9 | Comparative Example 10 | Example 13 | Example 14 |
|---|---|---|---|---|---|---|---|
| Tire durability (index) | (A) | 105 | 105 | 95 | — | 105 | 105 |
|  | (B) | — | 105 | 90 | — | — | 105 |
|  | (C) | — | 110 | 90 | — | — | 110 |

*1 amount of solid content based on 100 parts as a solid content of rubber latex

TABLE 7(a)

|  |  |  | Example 15 | Comparative Example 11 | Comparative Example 12 | Example 16 | Comparative Example 13 | Comparative Example 14 |
|---|---|---|---|---|---|---|---|---|
| Rubber latex composition (% by weight) | Composition of monomer mixture (a) | 2-vinylpyridine | 12.5 | 12.5 | — | 12.5 | — | — |
|  |  | styrene | 60 | 60 | — | 60 | — | — |
|  |  | 1,3-butadiene | 27.5 | 27.5 | — | 27.5 | — | — |
|  | Composition of monomer mixture (b) | 2-vinylpyridine | 15 | 15 | — | 15 | — | — |
|  |  | styrene | 15 | 15 | — | 15 | — | — |
|  |  | 1,3-butadiene | 70 | 70 | — | 70 | — | — |
|  | Composition of rubber latex particles as a whole | copolymer weight ratio (a')/(b') | 60/40 | 60/40 | — | 10/90 | — | — |
|  |  | 2-vinylpyridine | 13.5 | 13.5 | 15 | 14.75 | 14.75 | — |
|  |  | styrene | 42 | 42 | 15 | 19.5 | 19.5 | — |
|  |  | 1,3-butadiene | 44.5 | 44.5 | 70 | 65.75 | 65.75 | — |
| Resol type condensate |  | Compounding amount *1 (parts by weight) | 14 | 14 | 14 | 14 | 14 | 14 |
| Novolak type condensate |  | Kind | ISC-R50 | ISC-R50 | SC-700S | SC-700S | SC-700S | SC-700S |
|  | Area ratio of GPC peaks (%) | monomer | 15.54 | 15.54 | 15.14 | 15.14 | 15.14 | 15.14 |
|  |  | 2 nucleus body | 17.46 | 17.46 | 17.06 | 17.06 | 17.06 | 17.06 |
|  |  | 3 nucleus body | 15.30 | 15.30 | 15.16 | 15.16 | 15.16 | 15.16 |
|  |  | 4 nucleus body | 12.44 | 12.44 | 10.73 | 10.73 | 10.73 | 10.73 |
|  |  | 5 or more nuclei bodies | 39.26 | 39.26 | 41.91 | 41.91 | 41.91 | 41.91 |
|  |  | Compounding amount *1 (parts by weight) | 170 | 220 | 70 | 70 | 70 | 70 |
| Initial adhesion force (kg/cord) |  |  | 2.22 | 1.78 | 1.61 | 1.93 | 1.59 | 1.52 |
| Heat-resistant adhesion force (kg/cord) |  |  | 1.95 | 1.62 | 0.94 | 1.74 | 1.10 | 1.02 |
| Tire durability (index) | (A) |  | — | 95 | — | — | — | — |
|  | (B) |  | — | 90 | — | — | — | — |
|  | (C) |  | — | 90 | — | — | — | — |

TABLE 7(b)

|  |  |  | Example 17 | Example 18 | Example 19 | Comparative Example 15 | Comparative Example 16 | Comparative Example 17 |
|---|---|---|---|---|---|---|---|---|
| Rubber latex composition (% by weight) | Composition of monomer mixture (a) | 2-vinylpyridine | 12.5 | 12.5 | 12.5 | — | — | 12.5 |
|  |  | styrene | 60 | 60 | 60 | — | — | 60 |
|  |  | 1,3-butadiene | 27.5 | 27.5 | 27.5 | — | — | 27.5 |
|  | Composition of monomer mixture (b) | 2-vinylpyridine | 15 | 15 | 15 | — | — | 15 |
|  |  | styrene | 15 | 15 | 15 | — | — | 15 |
|  |  | 1,3-butadiene | 70 | 70 | 70 | — | — | 70 |
|  | Composition of rubber latex particles as a whole | copolymer weight ratio (a')/(b') | 30/70 | 50/50 | 70/30 | — | — | 90/10 |
|  |  | 2-vinylpyridine | 14.25 | 13.75 | 13.75 | 13.25 | — | 12.75 |
|  |  | styrene | 28.5 | 37.5 | 46.5 | 46.5 | — | 55.5 |
|  |  | 1,3-butadiene | 57.25 | 48.75 | 40.25 | 40.25 | — | 31.75 |
| Resol type condensate |  | Compounding amount *1 (parts by weight) | 14 | 14 | 14 | 14 | 14 | 14 |
| Novolak type condensate |  | Kind | SC-700S | SC-700S | SC-700S | SC-700S | SC-700S | SC-700S |
|  | Area ratio of GPC peaks (%) | monomer | 15.14 | 15.14 | 15.14 | 15.14 | 15.14 | 15.14 |
|  |  | 2 nucleus body | 17.06 | 17.06 | 17.06 | 17.06 | 17.06 | 17.06 |
|  |  | 3 nucleus body | 15.16 | 15.16 | 15.16 | 15.16 | 15.16 | 15.16 |
|  |  | 4 nucleus body | 10.73 | 10.73 | 10.73 | 10.73 | 10.73 | 10.73 |
|  |  | 5 or more nuclei bodies | 41.91 | 41.91 | 41.91 | 41.91 | 41.91 | 41.91 |
|  |  | Compounding amount *1 (parts by weight) | 70 | 70 | 70 | 70 | 70 | 70 |
| Initial adhesion force (kg/cord) |  |  | 1.94 | 2.55 | 2.53 | 0.70 | 1.06 | 1.31 |

TABLE 7(b)-continued

|  |  | Example 17 | Example 18 | Example 19 | Comparative Example 15 | Comparative Example 16 | Comparative Example 17 |
|---|---|---|---|---|---|---|---|
| Heat-resistant adhesion force (kg/cord) |  | 1.77 | 2.02 | 2.30 | 0.44 | 0.51 | 1.04 |
| Tire durability (index) | (A) | — | — | — | — | — | — |
|  | (B) | — | — | — | — | — | — |
|  | (C) | — | — | — | — | — | — |

*1 amount of solid content based on 100 parts as a solid content of rubber latex TABLE 8(a)

|  |  |  | Comparative Example 18 | Comparative Example 19 | Example 20 | Example 21 | Example 22 | Comparative Example 20 |
|---|---|---|---|---|---|---|---|---|
| Rubber latex composition (% by weight) | Composition of monomer mixture (a) | 2-vinylpyridine | — | — | 5 | 10 | 20 | 30 |
|  |  | styrene | — | 82.5 | 77.5 | 72.5 | 62.5 | 52.5 |
|  |  | 1,3-butadiene | — | 17.5 | 17.5 | 17.5 | 17.5 | 17.5 |
|  | Composition of monomer mixture (b) | 2-vinylpyridine | — | 15 | 15 | 15 | 15 | 15 |
|  |  | styrene | — | 15 | 15 | 15 | 15 | 15 |
|  |  | 1,3-butadiene | — | 70 | 70 | 70 | 70 | 70 |
|  | Composition of rubber latex | copolymer weight ratio (a')/(b') | — | 50/50 | 50/50 | 50/50 | 50/50 | 50/50 |
|  | particles as a whole | 2-vinylpyridine | 12.5 | 7.5 | 10 | 12.5 | 17.5 | 22.5 |
|  |  | styrene | 60 | 48.75 | 46.25 | 43.75 | 38.75 | 33.75 |
|  |  | 1,3-butadiene | 27.5 | 43.75 | 43.75 | 43.75 | 43.75 | 43.75 |
| Resol type condensate |  | Compounding amount *1 (parts by weight) | 14 | 14 | 14 | 14 | 14 | 14 |
| Novolak type condensate |  | Kind | SC-700S | SC-700S | SC-700S | SC-700S | SC-700S | SC-700S |
|  | Area ratio of GPC peaks (%) | monomer | 15.14 | 15.14 | 15.14 | 15.14 | 15.14 | 15.14 |
|  |  | 2 nucleus body | 17.06 | 17.06 | 17.06 | 17.06 | 17.06 | 17.06 |
|  |  | 3 nucleus body | 15.16 | 15.16 | 15.16 | 15.16 | 15.16 | 15.16 |
|  |  | 4 nucleus body | 10.73 | 10.73 | 10.73 | 10.73 | 10.73 | 10.73 |
|  |  | 5 or more nuclei bodies | 41.91 | 41.91 | 41.91 | 41.91 | 41.91 | 41.91 |
|  |  | Compounding amount *1 (parts by weight) | 70 | 70 | 70 | 70 | 70 | 70 |
| Initial adhesion force (kg/cord) |  |  | 0.62 | 1.49 | 1.96 | 2.22 | 2.47 | 1.81 |
| Heat-resistant adhesion force (kg/cord) |  |  | 0.38 | 1.31 | 1.71 | 1.95 | 1.74 | 0.85 |

TABLE 8(b)

|  |  |  | Comparative Example 21 | Example 23 | Example 24 | Example 25 | Example 26 | Example 27 |
|---|---|---|---|---|---|---|---|---|
| Rubber latex composition (% by weight) | Composition of monomer mixture (a) | 2-vinylpyridine | 15 | 15 | 15 | 15 | 15 | 15 |
|  |  | styrene | 85 | 75 | 65 | 55 | 45 | 35 |
|  |  | 1,3-butadiene | — | 10 | 20 | 30 | 40 | 50 |
|  | Composition of monomer mixture (b) | 2-vinylpyridine | 15 | 15 | 15 | 15 | 15 | 15 |
|  |  | styrene | 15 | 15 | 15 | 15 | 15 | 15 |
|  |  | 1,3-butadiene | 70 | 70 | 70 | 70 | 70 | 70 |
|  | Composition of rubber latex | copolymer weight ratio (a')/(b') | 50/50 | 50/50 | 50/50 | 50/50 | 50/50 | 50/50 |
|  | particles as a whole | 2-vinylpyridine | 15 | 15 | 15 | 15 | 15 | 15 |
|  |  | styrene | 50 | 45 | 40 | 35 | 30 | 25 |
|  |  | 1,3-butadiene | 35 | 40 | 45 | 50 | 55 | 60 |
| Resol type condensate |  | Compounding amount *1 (parts by weight) | 14 | 14 | 14 | 14 | 14 | 14 |
| Novolak type condensate |  | Kind | SC-700S | SC-700S | SC-700S | SC-700S | SC-700S | SC-700S |
|  | Area ratio of GPC peaks (%) | monomer | 15.14 | 15.14 | 15.14 | 15.14 | 15.14 | 15.14 |
|  |  | 2 nucleus body | 17.06 | 17.06 | 17.06 | 17.06 | 17.06 | 17.06 |
|  |  | 3 nucleus body | 15.16 | 15.16 | 15.16 | 15.16 | 15.16 | 15.16 |
|  |  | 4 nucleus body | 10.73 | 10.73 | 10.73 | 10.73 | 10.73 | 10.73 |
|  |  | 5 or more nuclei bodies | 41.91 | 41.91 | 41.91 | 41.91 | 41.91 | 41.91 |
|  |  | Compounding amount *1 (parts by weight) | 70 | 70 | 70 | 70 | 70 | 70 |
| Initial adhesion force (kg/cord) |  |  | 1.47 | 1.93 | 2.00 | 2.48 | 2.21 | 2.05 |
| Heat-resistant adhesion force (kg/cord) |  |  | 1.33 | 1.76 | 1.78 | 2.03 | 1.94 | 1.82 |

*1 amount of solid content based on 100 parts as a solid content of rubber latex TABLE 9(a)

| | | | Example 28 | Comparative Example 22 | Comparative Example 23 | Example 29 | Example 30 | Comparative Example 24 |
|---|---|---|---|---|---|---|---|---|
| Rubber latex composition (% by weight) | Composition of monomer mixture (a) | 2-vinylpyridine | 15 | 15 | 12.5 | 12.5 | 12.5 | 12.5 |
| | | styrene | 25 | 20 | 60 | 60 | 60 | 60 |
| | | 1,3-butadiene | 60 | 65 | 27.5 | 27.5 | 27.5 | 27.5 |
| | Composition of monomer mixture (b) | 2-vinylpyridine | 15 | 15 | — | 10 | 20 | 30 |
| | | styrene | 15 | 15 | 30 | 20 | 10 | — |
| | | 1,3-butadiene | 70 | 70 | 70 | 70 | 70 | 70 |
| | Composition of rubber | copolymer weight ratio (a')/(b') | — | 50/50 | 50/50 | 50/50 | 50/50 | 50/50 |
| | latex particles as a whole | 2-vinylpyridine | 15 | 15 | 6.25 | 11.25 | 16.25 | 21.25 |
| | | styrene | 20 | 17.5 | 45 | 40 | 35 | 30 |
| | | 1,3-butadiene | 65 | 67.5 | 48.75 | 48.75 | 48.75 | 48.75 |
| Resol type condensate | Compounding amount *1 (parts by weight) | | 14 | 14 | 14 | 14 | 14 | 14 |
| Novolak type condensate | Kind | | SC-700S | SC-700S | SC-700S | SC-700S | SC-700S | SC-700S |
| | Area ratio of GPC peaks (%) | monomer | 15.14 | 15.14 | 15.14 | 15.14 | 15.14 | 15.14 |
| | | 2 nucleus body | 17.06 | 17.06 | 17.06 | 17.06 | 17.06 | 17.06 |
| | | 3 nucleus body | 15.16 | 15.16 | 15.16 | 15.16 | 15.16 | 15.16 |
| | | 4 nucleus body | 10.73 | 10.73 | 10.73 | 10.73 | 10.73 | 10.73 |
| | | 5 or more nuclei bodies | 41.91 | 41.91 | 41.91 | 41.91 | 41.91 | 41.91 |
| | Compounding amount *1 (parts by weight) | | 70 | 70 | 70 | 70 | 70 | 70 |
| Initial adhesion force (kg/cord) | | | 2.02 | 1.67 | 1.59 | 1.96 | 2.26 | 1.66 |
| Heat-resistant adhesion force (kg/cord) | | | 1.73 | 1.19 | 1.10 | 1.88 | 2.05 | 0.92 |

TABLE 9(b)

| | | | Comparative Example 25 | Example 31 | Example 32 | Example 33 | Example 34 | Comparative Example 26 |
|---|---|---|---|---|---|---|---|---|
| Rubber latex composition (% by weight) | Composition of monomer mixture (a) | 2-vinylpyridine | 12.5 | 12.5 | 12.5 | 12.5 | 12.5 | 12.5 |
| | | styrene | 60 | 60 | 60 | 60 | 60 | 60 |
| | | 1,3-butadiene | 27.5 | 27.5 | 27.5 | 27.5 | 27.5 | 27.5 |
| | Composition of monomer mixture (b) | 2-vinylpyridine | 15 | 15 | 15 | 15 | 15 | 15 |
| | | styrene | — | 10 | 20 | 30 | 40 | 50 |
| | | 1,3-butadiene | 85 | 75 | 65 | 55 | 45 | 35 |
| | Composition of rubber | copolymer weight ratio (a')/(b') | 50/50 | 50/50 | 50/50 | 50/50 | 50/50 | 50/50 |
| | latex particles as a whole | 2-vinylpyridine | 13.75 | 13.75 | 13.75 | 13.75 | 13.75 | 13.75 |
| | | styrene | 30 | 35 | 40 | 45 | 50 | 55 |
| | | 1,3-butadiene | 56.25 | 51.25 | 46.25 | 41.25 | 36.25 | 31.25 |
| Resol type condensate | Compounding amount *1 (parts by weight) | | 14 | 14 | 14 | 14 | 14 | 14 |
| Novolak type condensate | Kind | | SC-700S | SC-700S | SC-700S | SC-700S | SC-700S | SC-700S |
| | Area ratio of GPC peaks (%) | monomer | 15.14 | 15.14 | 15.14 | 15.14 | 15.14 | 15.14 |
| | | 2 nucleus body | 17.06 | 17.06 | 17.06 | 17.06 | 17.06 | 17.06 |
| | | 3 nucleus body | 15.16 | 15.16 | 15.16 | 15.16 | 15.16 | 15.16 |
| | | 4 nucleus body | 10.73 | 10.73 | 10.73 | 10.73 | 10.73 | 10.73 |
| | | 5 or more nuclei bodies | 41.91 | 41.91 | 41.91 | 41.91 | 41.91 | 41.91 |
| | Compounding amount *1 (parts by weight) | | 70 | 70 | 70 | 70 | 70 | 70 |
| Initial adhesion force (kg/cord) | | | 1.46 | 1.96 | 2.42 | 2.10 | 1.92 | 1.26 |
| Heat-resistant adhesion force (kg/cord) | | | 0.78 | 1.70 | 2.14 | 1.85 | 1.73 | 1.08 |

*1 amount of solid content based on 100 parts as a solid content of rubber latex TABLE 10(a)

| | | | Example 2 | Example 35 | Comparative Example 27 | Example 36 | Comparative Example 28 |
|---|---|---|---|---|---|---|---|
| Rubber latex composition (% by weight) | Composition of monomer mixture (a) | 2-vinylpyridine | 12.5 | 12.5 | — | 12.5 | 20 |
| | | styrene | 60 | 60 | — | 60 | — |
| | | 1,3-butadiene | 27.5 | 27.5 | — | 27.5 | — |
| | Composition of monomer mixture (b) | 2-vinylpyridine | 15 | 15 | — | 15 | — |
| | | styrene | 15 | 15 | — | 15 | — |
| | | 1,3-butadiene | 70 | 70 | — | 70 | — |
| | Composition of rubber | copolymer weight ratio (a')/(b') | 60/40 | 60/40 | — | 60/40 | — |

TABLE 10(a)-continued

|  |  |  | Example 2 | Example 35 | Comparative Example 27 | Example 36 | Comparative Example 28 |
|---|---|---|---|---|---|---|---|
|  | latex | 2-vinylpyridine | 13.5 | 13.5 | — | 13.5 | — |
|  | particles | styrene | 42 | 42 | — | 42 | — |
|  | as a whole | 1,3-butadiene | 44.5 | 42 | — | 42 | — |
| Compounding amount of sequential copolymer rubber latex (parts by weight) |  |  | 100 | 80 | — | 60 | — |
| Compounding amount of Vp-St-Bd copolymer rubber latex *1 (parts by weight) |  |  | — | — | 80 | — | 60 |
| Compounding amount of SBR latex *2 (parts by weight) |  |  | 0 | 20 | 20 | 40 | 40 |
| Compounding of mixed rubber latex (parts by weight) |  |  | 100 | 100 | 100 | 100 | 100 |
| Resol type condensate | Compounding amount *3 (parts by weight) |  | 14 | 14 | 14 | 14 | 14 |
| Novolak type condensate | Kind |  | SC-700S | SC-700S | SC-700S | SC-700S | SC-700S |
|  | Area ratio of GPC peaks (%) | monomer | 15.14 | 15.14 | 15.14 | 15.14 | 15.14 |
|  |  | 2 nucleus body | 17.06 | 17.06 | 17.06 | 17.06 | 17.06 |
|  |  | 3 nucleus body | 15.16 | 15.16 | 15.16 | 15.16 | 15.16 |
|  |  | 4 nucleus body | 10.73 | 10.73 | 10.73 | 10.73 | 10.73 |
|  |  | 5 or more nuclei bodies | 41.91 | 41.91 | 41.91 | 41.91 | 41.91 |
|  | Compounding amount *1 (parts by weight) |  | 70 | 70 | 70 | 70 | 70 |
| Initial adhesion force (kg/cord) |  |  | 2.58 | 2.53 | 1.39 | 2.61 | 1.44 |
| Heat-resistant adhesion force (kg/cord) |  |  | 2.25 | 2.16 | 0.90 | 2.25 | 1.04 |

TABLE 10(b)

|  |  |  | Example 37 | Comparative Example 29 | Comparative Example 30 | Example 38 | Example 39 |
|---|---|---|---|---|---|---|---|
| Rubber latex composition (% by weight) | Composition of monomer mixture (a) | 2-vinylpyridine | 12.5 | — | — | 12.5 | 12.5 |
|  |  | styrene | 60 | — | — | 60 | 60 |
|  |  | 1,3-butadiene | 27.5 | — | — | 27.5 | 27.5 |
|  | Composition of monomer mixture (b) | 2-vinylpyridine | 15 | — | — | 15 | 15 |
|  |  | styrene | 15 | — | — | 15 | 15 |
|  |  | 1,3-butadiene | 70 | — | — | 70 | 70 |
|  | Composition of rubber | copolymer weight ratio (a')/(b') | 60/40 | — | — | 60/40 | 60/40 |
|  | latex particles as a whole | 2-vinylpyridine | 13.5 | — | — | 13.5 | 13.5 |
|  |  | styrene | 42 | — | — | 42 | 42 |
|  |  | 1,3-butadiene | 44.5 | — | — | 44.5 | 44.5 |
| Compounding amount of sequential copolymer rubber latex (parts by weight) |  |  | 40 | — | — | 60 | 20 |
| Compounding amount of Vp-St-Bd copolymer rubber latex *1 (parts by weight) |  |  | — | 40 | — | 40 | 80 |
| Compounding amount of SBR latex *2 (parts by weight) |  |  | 60 | 60 | 100 | — | — |
| Compounding of mixed rubber latex (parts by weight) |  |  | 100 | 100 | 100 | 100 | 100 |
| Resol type condensate | Compounding amount *3 (parts by weight) |  | 14 | 14 | 14 | 14 | 14 |
| Novolak type condensate | Kind |  | SC-700S | SC-700S | SC-700S | SC-700S | SC-700S |
|  | Area ratio of GPC peaks (%) | monomer | 15.14 | 15.14 | 15.14 | 15.14 | 15.14 |
|  |  | 2 nucleus body | 17.06 | 17.06 | 17.06 | 17.06 | 17.06 |
|  |  | 3 nucleus body | 15.16 | 15.16 | 15.16 | 15.16 | 15.16 |
|  |  | 4 nucleus body | 10.73 | 10.73 | 10.73 | 10.73 | 10.73 |
|  |  | 5 or more nuclei bodies | 41.91 | 41.91 | 41.91 | 41.91 | 41.91 |
|  | Compounding amount *1 (parts by weight) |  | 70 | 70 | 70 | 70 | 70 |
| Initial adhesion force (kg/cord) |  |  | 1.98 | 1.27 | 0.94 | 2.39 | 2.03 |
| Heat-resistant adhesion force (kg/cord) |  |  | 1.77 | 0.92 | 0.66 | 1.85 | 1.74 |

*1 same composition ratio as rubber latex of Comparative Example 1
*2 use of JSR2108, trade name, made by Japan Synthetic Rubber Co., Ltd.
*3 amount of solid content based on 100 parts by weight as solid content of mixed rubber latex

TABLE 11

|  |  |  | Example 40 | Comparative Example 31 | Example 41 | Comparative Example 32 | Example 42 | Comparative Example 33 | Example 43 | Comparative Example 34 |
|---|---|---|---|---|---|---|---|---|---|---|
| Composition of sequential copolymer rubber latex (% by weight) | Composition of monomer mixture (a) | 2-vinylpyridine | 12.5 | — | 12.5 | — | 12.5 | — | 12.5 | — |
|  |  | styrene | 57 | — | 59 | — | 57 | — | 60 | — |
|  |  | 1,3-butadiene | 27.5 | — | 27.5 | — | 27.5 | — | 27.5 | — |
|  |  | aliphatic vinyl compound *1 | 3 | — | 1 | — | 3 | — | — | — |
|  | Composition of monomer mixture (b) | 2-vinylpyridine | 15 | — | 15 | — | 15 | — | 15 | — |
|  |  | styrene | 12 | — | 12 | — | 12 | — | 12 | — |
|  |  | 1,3-butadiene | 70 | — | 70 | — | 70 | — | 70 | — |
|  |  | aliphatic vinyl compound *1 | 3 | — | 3 | — | 3 | — | 3 | — |
|  | Composition of rubber latex particles as a whole | copolymer weight ratio (a')/(b') | 60/40 | — | 60/40 | — | 60/40 | — | 60/40 | — |
|  |  | 2-vinylpyridine | 13.5 | 13.5 | 13.5 | 13.5 | 13.5 | 13.5 | 13.5 | 13.5 |
|  |  | styrene | 39.0 | 39.0 | 40.2 | 40.2 | 39.0 | 39.0 | 40.8 | 40.8 |
|  |  | 1,3-butadiene | 44.5 | 44.5 | 44.5 | 44.5 | 44.5 | 44.5 | 44.5 | 44.5 |
|  |  | aliphatic vinyl compound *1 | 3 | 3 | 1.8 | 1.8 | 3 | 3 | 1.2 | 1.2 |
| Compounding amounts of sequential copolymer rubber latex (parts by weight) |  |  | 100 | — | 100 | — | 100 | — | 100 | — |
| Compounding amount of Vp-St-Bd copolymer rubber latex *1 (parts by weight) |  |  | — | 100 | — | 100 | — | 100 | — | 100 |
| Compounding amount of SBR latex *2 |  |  | — | — | — | — | — | — | — | — |
| Compounding of mixed rubber latex (parts by weight) |  |  | 100 | 100 | 100 | 100 | 100 | 100 | 100 | 100 |
| Resol type condensate | Compounding amount *3 (parts by weight) |  | 14 | 14 | 14 | 14 | 14 | 14 | 14 | 14 |
| Novolak type condensate | Kind |  | SC-700S | SC-700S | SC-700S | SC-700S | SC-700S | SC-700S | SC-700S | SC-700S |
|  | Area ratio of GPC peaks (%) | monomer | 15.14 | 15.14 | 15.14 | 15.14 | 15.14 | 15.14 | 15.14 | 15.14 |
|  |  | 2 nucleus body | 17.06 | 17.06 | 17.06 | 17.06 | 17.06 | 17.06 | 17.06 | 17.06 |
|  |  | 3 nucleus body | 15.16 | 15.16 | 15.16 | 15.16 | 15.16 | 15.16 | 15.16 | 15.16 |
|  |  | 4 nucleus body | 10.73 | 10.73 | 10.73 | 10.73 | 10.73 | 10.73 | 10.73 | 10.73 |
|  |  | 5 or more nuclei bodies | 41.91 | 41.91 | 41.91 | 41.91 | 41.91 | 41.91 | 41.91 | 41.91 |
|  | Compounding amount *1 (parts by weight) |  | 70 | 70 | 70 | 70 | 70 | 70 | 70 | 70 |
| Initial adhesion force (kg/cord) |  |  | 2.28 | 1.55 | 2.24 | 1.72 | 2.52 | 1.43 | 2.25 | 1.62 |
| Heat-resistant adhesion force (kg/cord) |  |  | 2.07 | 0.88 | 2.11 | 0.94 | 2.30 | 0.82 | 2.07 | 1.17 |

*1 see Table 12
**use of JSR2108, trade name, made by Japan Synthetic Rubber Co., Ltd.
*3 amount of solid content based on 100 partgs by weight as solid content of mixed rubber latex

TABLE 12

| Example 40 | Acrylonitrile |
| Comparative Example 31 | Acrylonitrile |
| Example 41 | Methyl methacrylate |
| Comparative Example 32 | Methyl methacrylate |
| Example 42 | Monomer mixture (a): Acrylonitrile  Monomer mixture (b): Methyl methacrylate |
| Comparative Example 33 | Acrylonitrile/methyl methacrylate (=6:4 (weight ratio)) |
| Example 43 | Itaconic acid |
| Comparative Example 34 | Itaconic acid |

As shown in Tables 5–11, it is apparent that each of the examples is excellent in the initial adhesion force, heat-resistant adhesion force and tire (high-speed) durability as compared with the corresponding comparative example(s).

Moreover, they are further mentioned as follows.

Comparative Example 5 is an example having no resol type condensate as compared with Example 1.

Example 7 is an example having a reduced amount of 5 or more nuclei connecting bodies in the novolak type condensate.

Example 8 has the same composition as in Example 1, but is an example that the charging order of the monomer mixtures is inverse in the preparation of the rubber latex.

Comparative Example 6 is an example not compounding the novolak condensate as compared with Example 8.

Example 9 is an example that the preparation method of resol type condensate is different from that of Example 1.

Comparative Example 7 is an example not compounding the novolak condensate as compared with Example 9.

Comparative example 8 is an example co-using the novolak condensate (ISC-R50) as a starting material for the preparation of the resol type condensate. When the novolak condensate is used as a starting material for the resol type condensate, it can be seen that the improvement of the adhesion force aiming at the invention is not obtained.

Example 10 is an example compounding the novolak condensate into Comparative Example 8.

Examples 11, 12 and Comparative Examples 5, 9 are examples showing that the compounding amount of the resol type condensate based on 100 parts by weight as a solid content of the rubber latex is suitable within a range of 4–35 parts by weight.

Comparative Example 10 is an example that the total amount of resorcin-formaldehyde resin is equal to 84 parts by weight of Example 1. It is apparent that even if the total amount is same, the novolak condensate is necessary for obtaining the high adhesion force.

Examples 13, 14, 15 and Comparative Example 11 are examples showing that the suitable range of the compounding amount of the novolak condensate based on 100 parts by weight as a solid content of the rubber latex should be within a range of 10–170 parts by weight.

Further, Examples 1–7 are examples showing that in order to obtain a high adhesion force including the heat resistance, the novolak condensate is necessary to contain a 2–4 resorcin nuclei connecting component so as to have an area ratio through GPC analysis of not less than 40%, preferably not less than 50%. Further, it is apparent that it is suitable that the peak area ratio of monomer component through GPC analysis is not more than 25% and that of component connecting 5 or more resorcin nuclei bodies is not more than 50%.

Examples 16–19 and Comparative Example 17 are examples showing that the weight ratio of copolymer obtained from the monomer mixture 8a) to copolymer obtained from the monomer mixture (b) is required to be 10/90–80/20 in order to obtain an effect of providing the initial adhesion force equal to or more than the comparative example and of controlling the lowering of the heat-resistant adhesion force.

Moreover, Comparative Examples 12–16, 18 are examples using rubber latex particles obtained by polymerizing the monomer mixture having a single composition.

Comparative Example 12 has a polymer composition ratio equal to the composition of the copolymer (b') in Examples 16–19 and the like, Comparative Example 18 has a polymer composition ratio equal to the composition of the copolymer (a') in Examples 16–19 and the like, Comparative Example 13 has a polymer composition ratio equal to the composition of the whole particles in Example 16, Comparative Example 15 has a polymer composition ratio equal to the composition of the whole particles in Example 19. The polymer composition ratios in Comparative Examples 14, 16 are a mixture of Comparative Example 12 equal to the composition of the copolymer component (b') and Comparative Example 18 equal to the composition of the copolymer component (a') in Examples 16–19 and the like, in which the mixing ratio of Comparative Example 14 is equal to the weight ratio of copolymer component (a')/copolymer component (b') in Example 16 and Comparative Example 16 is equal to the weight ratio of copolymer component (a')/copolymer component (b') in Example 19.

The adhesion forces of these comparative examples, i.e. initial adhesion force and heat-resistant adhesion force are poor as compared with those of the examples, from which it is apparent that the same particles has the structure of copolymers having different composition ratios.

Examples 20–28 and Comparative Examples 19–22 are examples showing that the necessary range of monomer composition in the monomer mixture (a) is low in the butadiene content as compared with the monomer mixture (b), and 3–25% by weight in vinylpyridine content, 25–80% by weight in styrene content and 5–60% by weight in butadiene content.

Examples 29–34 and Comparative Examples 23–26 are examples showing that the necessary range of monomer composition in the monomer mixture (b) is high in the butadiene content as compared with the monomer mixture (a), and 5–25% by weight in vinylpyridine content, 5–45% by weight in styrene content and 40–83% by weight in butadiene content.

Example 2, 35–39 and Comparative Examples 27–30 are examples showing that the Vp-St-Bd type sequential copolymer rubber latex according to the invention is effective to be included in an amount of not less than 20% by weight.

Comparative Examples 27–29 are examples using the styrene-butadiene copolymer rubber latex, and Examples 38, 39 are examples using a mixture of Vp-St-Bd copolymer rubber latex obtained by polymerization of the monomer mixture satisfying the composition range of the monomer mixture (b).

Examples 40–43 are examples replacing a part of styrene monomer in each of the monomer mixture (a) and the monomer mixture (b) with the other copolymerizable monomer unit (aliphatic vinyl compound) in the Vp-St-Bd sequentially polymerized copolymer rubber latex, from which it is clear that the replacement is possible in an amount not damaging the split of the invention.

Moreover, Comparative Examples 31–34 are examples showing that vinylpyridine-styrene-butadiene copolymer particles obtained by sequentially polymerizing the monomer mixture (a) and the monomer mixture (b) are necessary.

As mentioned above, the adhesion deterioration accompanied with the vulcanization reaction is controlled by compounding the rubber latex according to the invention, so that there can be obtained the effect of controlling the lowering of the adhesion force at a higher temperature in vulcanization step or in product use.

Further, the effect of improving the adhesion force between the reinforcing material and adherend rubber can be obtained by the action of the novolak type condensate used in the adhesive composition according to the invention as an adhesion/tackiness imparting resin.

And also, the adhesive composition according to the invention is one-package form when adhering adherend rubber and the reinforcing material and can provide effects such as good storage stability, free from toxicity-environmental pollution, free from the lowering of fiber strength by the adhesion treatment, high adhesion property, and the sufficient high adhesion force can be maintained at a higher temperature applied in the working course or in use or the sufficient heat resistance is held.

Moreover, the effect of realizing a high-durability pneumatic tire not causing any lowering of adhesion nor of strength even under use at high speed and high load, in another word, at a high temperature and high strain can be obtained by using the adhesive composition according to the invention.

We claim:

1. An adhesive composition characterized in that 14–205 parts by weight as a solid content of a thermosetting resin including a resol condensate obtained by a resol-forming reaction between resorcin and formaldehyde and a novolak condensate obtained by a novolak-forming reaction between resorcin and formaldehyde is included based on 100 parts by weight as a solid content of vinylpyridine-styrene-butadiene sequential copolymer rubber latex containing 20–100% by weight of vinylpyridine-styrene-butadiene sequential copolymer obtained by sequential-polymerization of (a) a monomer mixture of 3–25% by weight of a pyridine ring containing compound, 25–80% by weight of an unsubstituted or substituted styrene, or of an unsubstituted or substituted styrene and an aliphatic vinyl compound, and 5–60% by weight of a conjugated diene compound, and (b) a monomer mixture of 5–25% by weight of a pyridine ring containing vinyl compound, 5–45% by weight of an unsubstituted or substituted styrene, or of an unsubstituted or substituted styrene and an aliphatic vinyl compound, and 40–83% by weight of a conjugated diene compound, in which a weight ratio of a copolymer component (a') obtained by the polymerization of the monomer mixture (a) to a copolymer component (b') obtained by the polymerization of the monomer mixture (b) in the resulting vinylpyridine-styrene-butadiene type sequential copolymer is 10/90–80/20, and the content of the conjugated vinyl compound in the monomer mixture (b) is higher than that in the monomer mixture (a).

2. An adhesive composition according to claim 1, wherein the amount of the aliphatic vinyl compound in each of the monomer mixture (a) and the monomer mixture (b) is not more than 15% by weight.

3. An adhesive composition according to claim 1, wherein not more than 80% by weight as a solid content of the rubber latex is styrene-butadiene copolymer and/or the copolymer obtained by the polymerization of a monomer mixture satisfying a composition range of the monomer mixture (b).

4. An adhesive composition according to claim 1, wherein the resol type condensate is obtained by a resol-forming reaction under mixing with the rubber latex.

5. An adhesive composition according to claim 1, wherein the novolak condensate is added as an adhesion promoter to a composition comprising the rubber latex and the resol type condensate.

6. An adhesive composition according to claim 1, wherein an area ratio of 2–4 resorcin nuclei connecting component in the novolak condensate is not less than 40% through an analysis of gel permeation chromatography.

7. A pneumatic tire characterized by using polyester cord subjected to an adhesion treatment with an adhesive composition claimed in any one of claims 1–6 as a reinforcing material.

* * * * *